(12) United States Patent
Kim et al.

(10) Patent No.: US 7,267,447 B2
(45) Date of Patent: *Sep. 11, 2007

(54) VARIABLE FOCAL LENGTH LENS COMPRISING MICROMIRRORS

(75) Inventors: Tae Hyeon Kim, Taejeon (KR); Sang Hyune Baek, Suwon (KR)

(73) Assignees: Angstrom, Inc., Suwon (KR); Stereo Display, Inc., Ansheim, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 10/983,353

(22) Filed: Nov. 8, 2004

(65) Prior Publication Data

US 2005/0264870 A1 Dec. 1, 2005

Related U.S. Application Data

(63) Continuation-in-part of application No. 10/893,039, filed on Jul. 16, 2004, now Pat. No. 7,239,438, and a continuation-in-part of application No. 10/872,241, filed on Jun. 18, 2004, and a continuation-in-part of application No. 10/857,796, filed on May 28, 2004, now Pat. No. 6,934,073, and a continuation-in-part of application No. 10/857,714, filed on May 28, 2004, now Pat. No. 7,161,729, and a continuation-in-part of application No. 10/857,280, filed on May 28, 2004, now Pat. No. 6,999,226, and a continuation-in-part of application No. 10/855,554, filed on May 27, 2004, now Pat. No. 6,970,284, and a continuation-in-part of application No. 10/855,715, filed on May 27, 2004, now Pat. No. 7,031,046, and a continuation-in-part of application No. 10/855,287, filed on May 27, 2004, now Pat. No. 6,934,072.

(51) Int. Cl.
*G02B 7/182* (2006.01)
*G02B 26/00* (2006.01)

(52) U.S. Cl. .................. 359/846; 359/291
(58) Field of Classification Search ........... 359/846
See application file for complete search history.

(56) References Cited

U.S. PATENT DOCUMENTS 2,002,376 A 5/1935 Manfred (Continued)

OTHER PUBLICATIONS

Kaneko et al., 2000, "Quick Response Dynamic Focusing Lens using Multi-Layered Piezoelectric Bimorph Actuator," Proceeding of SPIE vol. 4075: 24-31.

(Continued)

*Primary Examiner*—Ricky Mack
*Assistant Examiner*—William C Choi

(57) ABSTRACT

A variable focal length lens consists of many micromirrors with degrees of freedom rotation and/or degrees of freedom translation and actuating components. As operating methods for the lens, the actuating components control the positions of micromirrors electrostatically and/or electromagnetically. The optical efficiency of the variable focal length lens is increased by locating a mechanical structure upholding micromirrors and the actuating components under micromirrors. The lens can correct aberration by controlling each micromirror independently. The lens can also be of a desired arbitrary shape and/or size. The micromirrors are arranged in a flat plane or in a curved plane with a predetermined curvature. The electrodes determining the position of the micromirrors can be made of material with high electrical conductivity, preferably metal. The surface material of the micromirror is made of a material with high reflectivity such as aluminum, silver, and gold, which are coated with multilayer dielectric material or antioxidant.

48 Claims, 19 Drawing Sheets

U.S. PATENT DOCUMENTS

| | | |
|---|---|---|
| 4,834,512 A | 5/1989 | Austin |
| 5,986,811 A | 11/1999 | Wohlstadter |
| 6,111,900 A | 8/2000 | Suzudo |
| 6,549,730 B1 * | 4/2003 | Hamada .................. 396/111 |
| 6,658,208 B2 | 12/2003 | Watanabe et al. |
| 6,833,938 B2 | 12/2004 | Nishioka |
| 6,906,848 B2 * | 6/2005 | Aubuchon .................. 359/291 |
| 6,934,072 B1 * | 8/2005 | Kim et al. .................. 359/291 |
| 7,161,729 B2 * | 1/2007 | Kim et al. .................. 359/291 |
| 2002/0102102 A1 | 8/2002 | Watanabe et al. |
| 2005/0057812 A1 | 3/2005 | Raber |
| 2006/0209439 A1 * | 9/2006 | Cho et al. .................. 359/851 |

OTHER PUBLICATIONS

Cho, 2003, "Fast-response Variable Focusing Micromirror Array Lens," Proceedings of SPIE vol. 5055: 278-286.

* cited by examiner

VARIABLE FOCAL LENGTH LENS COMPRISING MICROMIRRORS

RELATED APPLICATION

This application is a continuation-in-part of U.S. patent application Ser. Nos. 10/855,554 for "Variable Focusing Lens comprising Micromirrors with One Degree of Freedom Rotation" filed on May 27, 2004 now U.S. Pat. No. 6,970,284, Ser. No. 10/855,715 for "Variable Focusing Lens comprising Micromirrors with Two Degrees of Freedom Rotation" filed on May 27, 2004 now U.S. Pat. No. 7,031,046, Ser. No. 10/855,287 for "Variable Focusing Lens comprising Micromirrors with Two Degrees of Freedom Rotation and One Degree of Freedom Translation" filed on May 27, 2004 now U.S. Pat. No. 6,934,072, Ser. No. 10/857,796 for "Variable Focusing Lens comprising Micromirrors with One Degree of Freedom Rotation and One Degree of Freedom Translation" filed on May 28, 2004 now U.S. Pat. No. 6,934,073, Ser. No. 10/857,714 for "Array of Micromirror Array Lenses" filed on May 28, 2004 now U.S. Pat. No. 7,161,729, Ser. No. 10/857,280 for "Variable Focusing Lens comprising Micromirrors with One Degree of Freedom Translation" filed on May 28, 2004 now U.S. Pat. No. 6,999,226, Ser. No. 10/872,241 for "Discretely Controlled Micromirror with Multi-Level Positions" filed on Jun. 18, 2004, and Ser. No. 10/893,039 for "Variable Focal Length Lens and Lens Array comprising Discretely Controlled Micromirrors" filed on Jul. 16, 2004 now U.S. Pat. No. 7,239,438.

BACKGROUND OF THE INVENTION

The present invention relates to a variable focal length lens comprising micromirrors, in which the rotation, the translation, or the rotation and translation of the micromirrors is controlled.

A most widely used conventional variable focal length system is the one using two refractive lenses. It has complex driving mechanisms to control the relative positions of refractive lenses and a slow response time. Alternatively, variable focal length lenses have been made. Variable focal length lenses can be made by changing the shape of the lens, as is found in the human eye; this method has been used in lenses made with isotropic liquids.

Other lenses have been made of electrically variable refractive index media to create either a conventional lens or a gradient index lens by means of a voltage gradient. The electrically variable refractive index allows the focal length of the lenses to be voltage controlled. Among them, the most advanced variable focal length lens is a liquid crystal variable focal length lens, which has a complex mechanism to control the focal length. Its focal length is changed by modulating the refractive index. Unfortunately, it has a slow response time typically on the order of hundreds of milliseconds. Even though the fastest response liquid crystal lens has the response time of tens of milliseconds, it has small focal length variation and low focusing efficiency.

To solve the disadvantages of the conventional focal length lens, a fast-response micromirror array lens was proposed. The details of the fast-response micromirror array lens are described in J. Boyd and G. Cho, 2003, "Fast-response Variable Focusing Micromirror Array Lens," *Proceeding of SPIE* Vol. 5055: 278-286. The paper is incorporated by reference into this disclosure as if fully set forth herein. The micromirror array lens mainly consists of micromirrors and actuating components, and uses a much simpler mechanism to control the focusing system than a liquid crystal variable focal length lens. The focal length of the micromirror array lens is varied with the displacement of each micromirror. But, the paper only describes basic idea related to design and control. This invention improves the design and control of the micromirror array lens. This invention extends advantages and applications of the lens.

SUMMARY OF THE INVENTION

The present invention contrives to solve the disadvantages of the conventional variable focal length lens.

The objective of the invention is to improve the design and control of the micromirror array lens. The invention extends advantages and applications of the lens.

The invention works as a variable focal length lens, and consists of many micromirrors to reflect the light and actuating components to control positions of the micromirrors. Each micromirror has the same function as a mirror. Therefore, the reflective surface of the micromirror is made of metal, metal compound, multi-layered dielectric material, or other materials with high reflectivity such as aluminum coated with multi-layer dielectric material, aluminum coated with antioxidant, silver coated with multi-layer dielectric material, silver coated with antioxidant, gold, and gold coated with multi-layer dielectric material. Many known microfabrication processes can make the surface of the micromirror to have high reflectivity. By making all light scattered from one point of an object have the same periodical phase and converge at one point of image plane, the micromirror array works as a reflective variable focal length lens. In order to do this, the micromirrors are electrostatically and/or electromagnetically controlled to have desired positions by actuating components. The focal length of the lens is changed by controlling both translation and rotation of each micromirror.

The micromirror array lens can be formed by a polar array of the micromirrors. For the polar array, each micromirror has a fan shape to increase an effective reflective area, so that the optical efficiency increases. The optical efficiency of the micromirror array lens can be improved by locating a mechanical structure upholding micromirrors and the actuating components under micromirrors to increase an effective reflective area. Electric circuits to operate the micromirrors can be replaced with known semiconductor microelectronics technologies such as MOS and CMOS. Applying the microelectronics circuits under micromirror array, the effective reflective area can be increased by removing necessary area for electrode pads and wires.

The micromirrors are arranged to form one or more concentric circles to form the axisymmetric lens and the micromirrors on the same concentric circle can be controlled by the same electrodes with concentric circle shape or independently controlled by known semiconductor microelectronics technologies such as MOS or CMOS. Also, the micromirrors are arranged to form one or more ellipses and the micromirrors on the same ellipse can be controlled by the same electrodes with elliptical shape or independently controlled.

It is desired that each of the micromirrors has a curvature because the ideal shape of a conventional reflective lens has a curvature. If the size of the flat micromirror is small enough, the aberration of the lens comprising flat micromirrors is also small enough. In this case, the micromirror does not need a curvature.

The lens can correct aberration, which is caused by optical effects due to the medium between the object and its image or is caused by defects of a lens system that cause its image to deviate from the rules of paraxial imagery, by controlling each micromirror independently. Independent control of each micromirror is also possible by replacing electric circuits required for control with known MOS or CMOS technologies and fabricating the circuits underneath the micromirrors using known microfabrication methods.

The array comprising micromirrors with two degree of freedom rotations and one degree of freedom translation which are controlled independently can make a lens with arbitrary shape and/or size. Incident lights can be modulated arbitrarily by forming arbitrary shape and/or size of a lens. To do this, it is required that incident lights are deflected to arbitrary directions by controls of two degree of freedom rotations and one degree of freedom translation. Independent translation of each micromirror is also required to satisfy the phase condition.

In some application as in the oblique arrangement of the lens with respect to the optical axis of the system, it is preferable that the micromirrors are controlled independently for the lens comprising micromirrors with two degrees of freedom rotation or two degrees of freedom rotation and one degree of freedom translation and that the micromirrors are arranged along ellipses and controlled by electrodes arranged along ellipses for the lens comprising micromirrors with one degree of freedom rotation or one degree of freedom rotation and one degree of freedom translation.

Furthermore, the micromirrors can be arranged in a curved plane with a predetermined curvature instead of in a flat plane, in order to facilitate obtaining a large numerical aperture with a small rotation of the mirrors.

In an improvement, the electrode wire can be made of material with a high electrical conductivity, preferably metal, to reduce the electrical resistance of the wire.

The advantages of the present invention are: (1) the micromirror array lens has a very fast response time because each micromirror has a tiny mass; (2) the lens has a large focal length variation because a large numerical aperture variation can be achieved by increasing the maximum rotational angle of the micromirror; (3) the lens has a high optical focusing efficiency; (4) the lens can have a large size aperture without losing optical performance. Because the micromirror array lens consists of discrete micromirrors, the increase in the lens size does not cause the increase in aberration caused by shape error of a lens; (5) the lens has a low cost because of the advantages of its mass productivity; (6) the lens can correct aberration; (7) the lens makes the focusing system much simple; (8) the lens can have arbitrary shape and/or size.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with references to the accompanying drawings, wherein.

DETAILED DESCRIPTION OF THE INVENTION

The U.S. patent application Ser. Nos. 10/855,554, 10/855,715, 10/855,287, 10/857,796, 10/857,714, 10/857,280, 10/872,241, and 10/893,039, are incorporated by reference into this disclosure as if fully set forth herein.

A first embodiment is shown in FIGS. 1 through 7.

Figure 1:
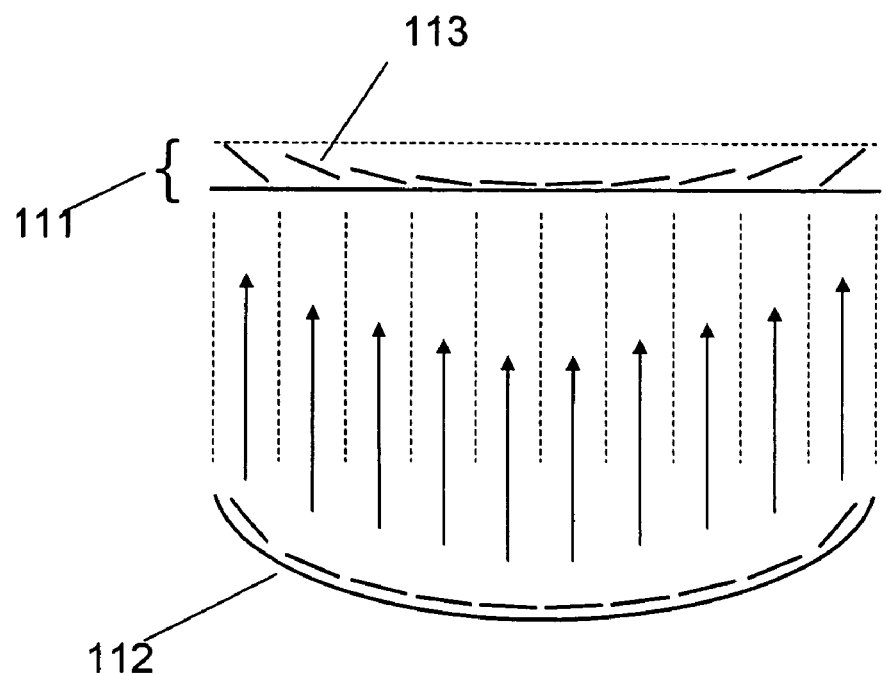
FIG. 1 is a schematic diagram of a first embodiment showing the cut-away side view of a micromirror array lens.

FIG. 1 illustrates the principle of the micromirror array lens 111. There are two conditions to make a perfect lens. The first is the converging condition that all lights scattered by one point of an object should converge into one point of the image plane. The second is the same phase condition that all converging light should have the same phase at the image plane. To satisfy the perfect lens conditions, the surface shape of conventional reflective lens 112 is formed to have all lights scattered by one point of an objective to be converged into one point of the image plane and have the optical path length of all converging light to be same.

A micromirror array arranged in flat plane can satisfy two conditions to be a lens. Each of the micromirrors 113 rotates to converge the scattered light. Because all micromirrors 113 of the micromirror array lens 111 are arranged in a flat plane as shown in FIG. 1, the optical path length of lights converged by rotation of the micromirrors is different. Even though the optical path length of converging light is different, the same phase condition can be satisfied by adjusting the phase because the phase of light is periodic.

Figure 2:
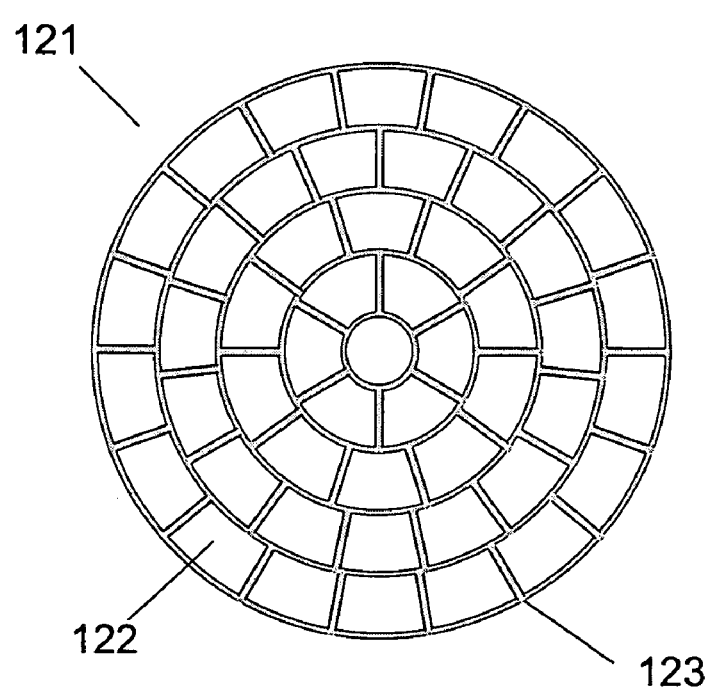
FIG. 2 is an in-plane schematic view showing one of the structures of the micromirror array lens that is made of many micromirrors and actuating components.

FIG. 2 illustrates the in-plane view of the micromirror array lens 121. The micromirror 122 has the same function as a mirror. Therefore, the reflective surface of the micromirror 122 is made of metal, metal compound, multi-layered dielectric material, or other materials with high reflectivity. Many known microfabrication processes can make the surface with high reflectivity. Each micromirror 122 is electrostatically and/or electromagnetically controlled by the actuating components 123 as known. In case of an axisymmetric lens, the micromirror array lens 121 has a polar array of the micromirrors 122. Each of the micromirrors 122 has a fan shape to increase an effective reflective area, which increases optical efficiency. The micromirrors are arranged to form one or more concentric circles to form the axisymmetric lens and the micromirrors on the same concentric circle can be controlled by the same electrodes or independently controlled by known semiconductor microelectronics technologies such as MOS or CMOS.

The mechanical structure upholding each reflective micromirror 122 and the actuating components 123 are located under the micromirrors 122 to increase the effective reflective area. Also, electric circuits to operate the micromirrors can be replaced with known semiconductor microelectronics technologies such as MOS and CMOS. Applying the microelectronics circuits under micromirror array, the effective reflective area can be increased by removing necessary area for electrode pads and wires used to supply actuating power.

Figure 3:
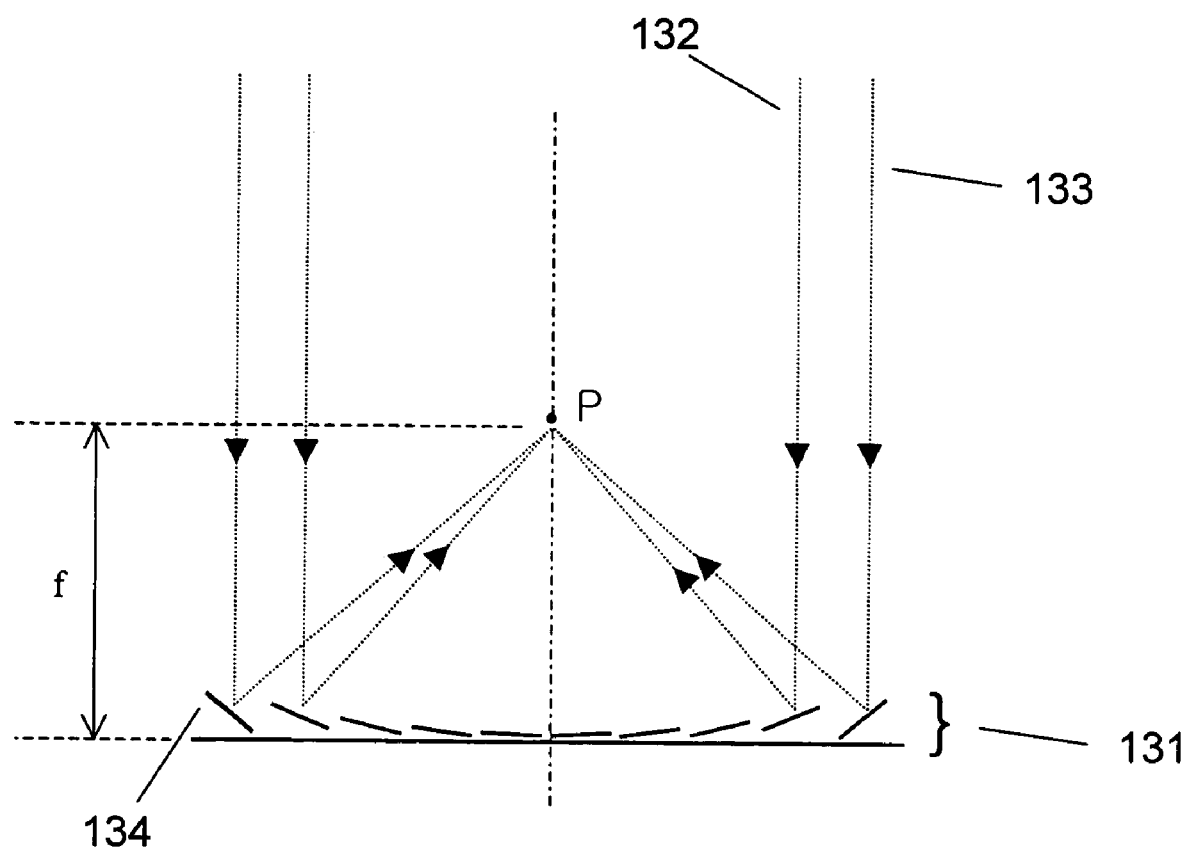
FIG. 3 is a schematic diagram showing how a micromirror array lens works as a lens.

FIG. 3 illustrates how the micromirror array lens 131 images. Arbitrary scattered lights 132, 133 are converged into one point P of the image plane by controlling the positions of the micromirrors 134. The phases of arbitrary light 132, 133 can be adjusted to be same by translating the micromirrors 134. The required translational displacement is at least half of the wavelength of light.

It is desired that each of the micromirrors 134 has a curvature because the ideal shape of a conventional reflective lens 112 has a curvature. If the size of the flat micromirror is small enough, the aberration of the lens comprising flat micromirrors 134 is also small enough. In this case, the micromirror does not need a curvature.

The focal length f of the micromirror array lens 131 is changed by controlling the rotation and the translation of each micromirror 134.

Figure 4:
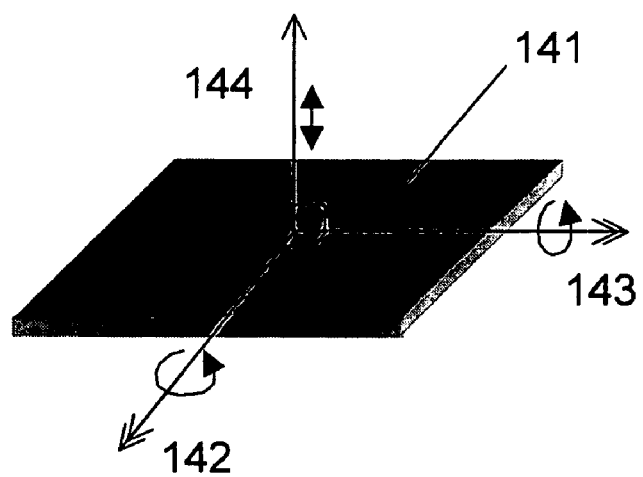
FIG. 4 is a schematic diagram showing two rotational axes and one translational axis of the micromirror.

FIG. 4 shows two degrees of freedom (DOF) rotation and one degree of freedom translation of the micromirror 141. The array comprising micromirrors 141 with two degree of freedom rotations 142, 143 and one degree of freedom translation 144, which are controlled independently, can make a lens with arbitrary shape and/or size. Incident lights can be modulated arbitrarily by forming an arbitrary shape and/or size lens. To do this, it is required that incident lights are deflected to an arbitrary direction by controls of two degree of freedom rotations 142, 143. Independent translation 144 of each micromirror is also required to satisfy the phase condition.

Figure 5A:
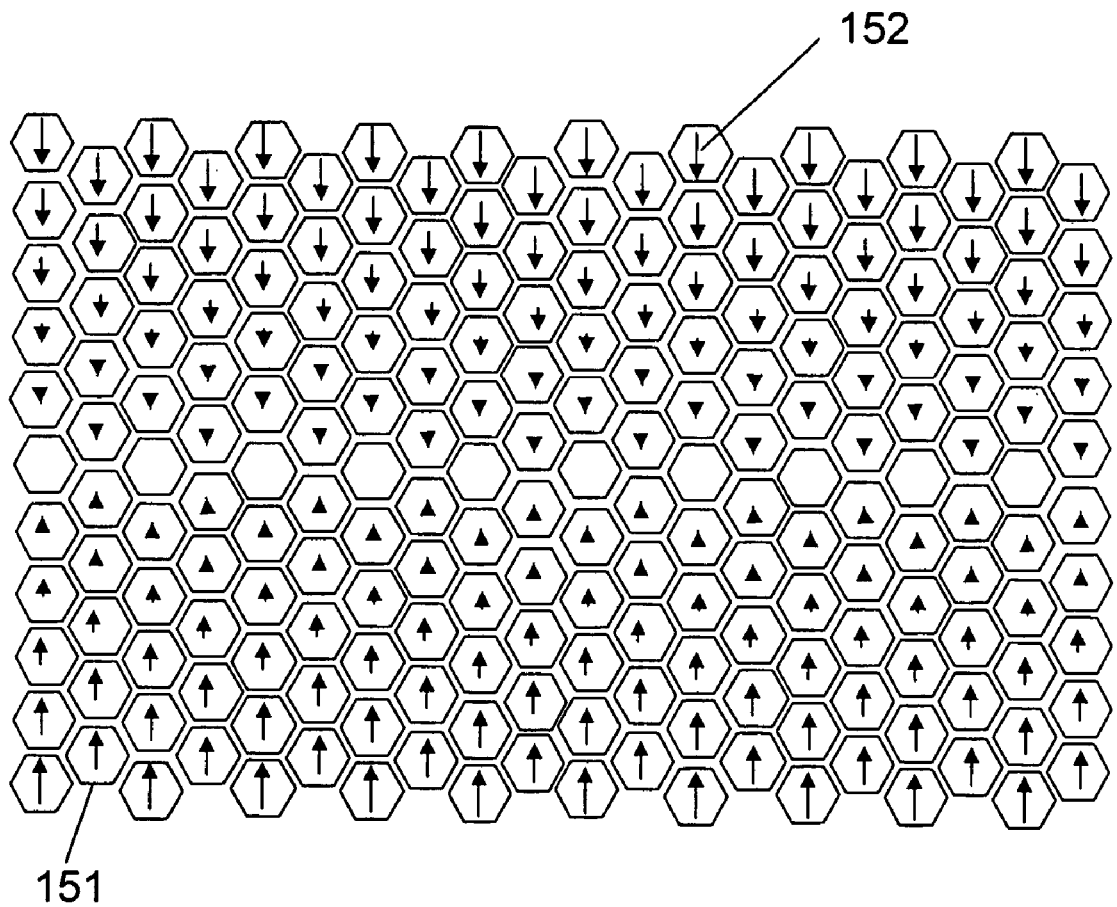
FIGS. 5a-5b are schematic diagrams showing the lenses comprising hexagonal micromirrors.
Figure 5B:
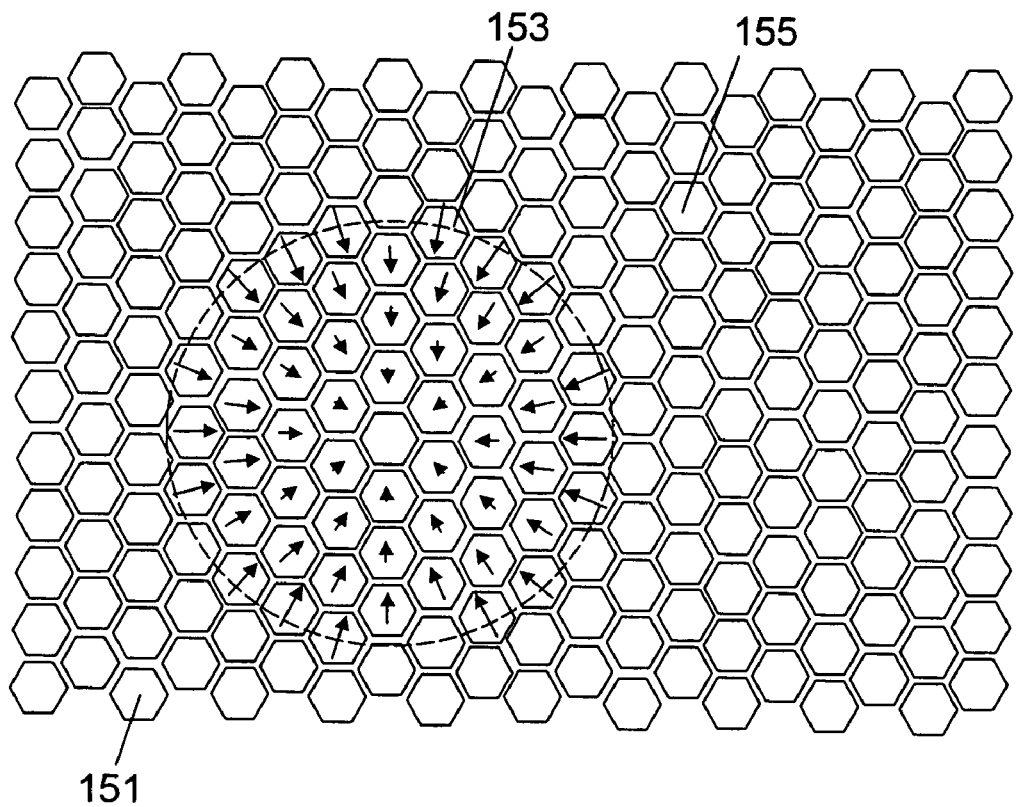
Figure 6:
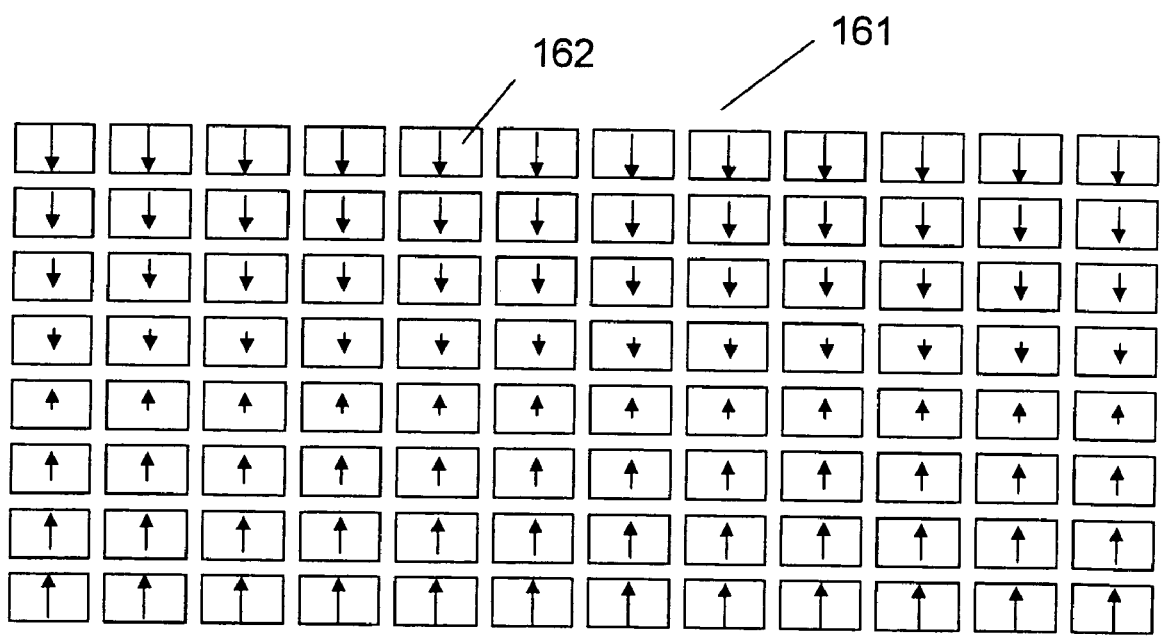
FIG. 6 is a schematic diagram showing the cylindrical lens comprising rectangular micromirrors.
Figure 7:
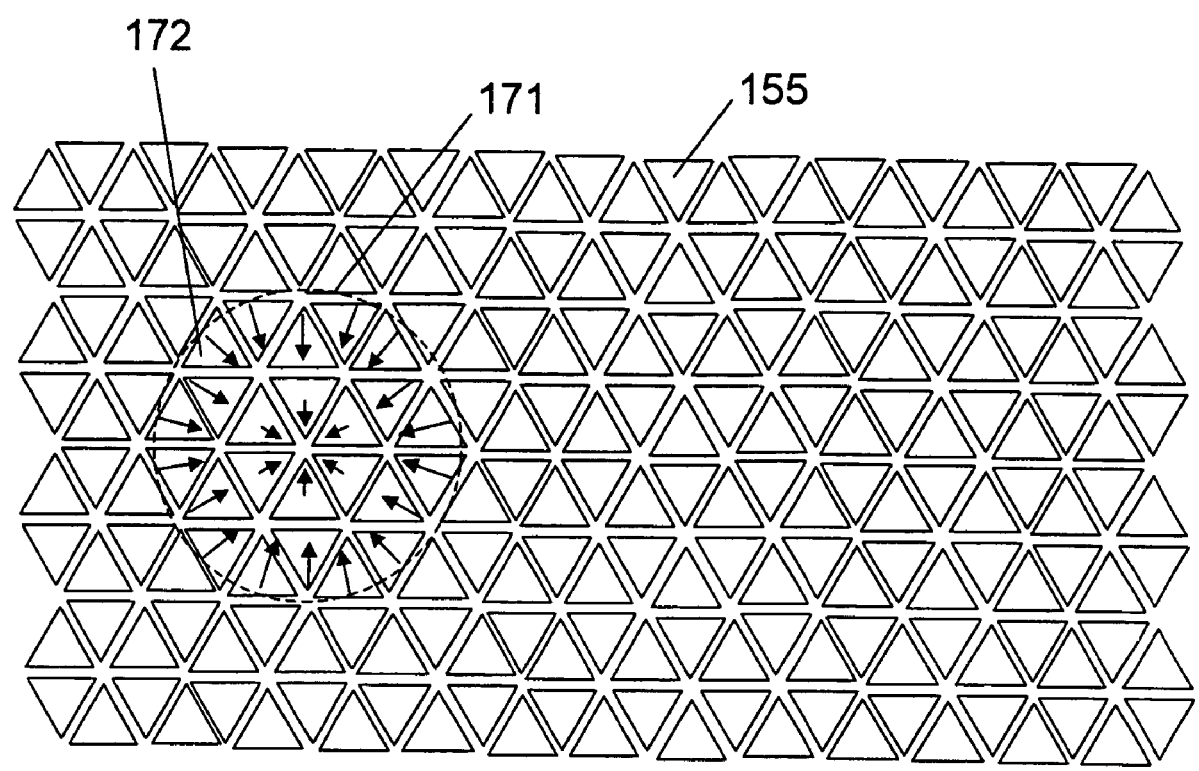
FIG. 7 is a schematic diagram showing the circular lens comprising triangular micromirrors.

In FIGS. 5a, 5b, 6 and 7, the rotational amount of a micromirror is represented by length of arrow 152 and the profile gradient direction to represent a rotational direction of a micromirror is represented by direction of arrow 152. FIG. 5a shows a variable focal length cylindrical lens comprising hexagonal micromirrors 151. FIG. 5b shows a variable focal length circular lens 153 comprising hexagonal micromirrors 151. Shape, position and size of the variable focal length circular lens 153 can be changed by independent control of micromirrors 151 with two DOF rotations and one DOF translation. In FIGS. 5b and 7, micromirrors 155 which are not elements of the lens are controlled to make lights reflected by the micromirrors 155 not have influence on imaging or focusing.

Even though FIGS. 5a-5b show hexagonal micromirrors 151, fan shape, rectangle, square, and triangle micromirrors array can be used. An array comprising fan shape micromirrors is appropriate to an axisymmetric lens. FIG. 6 shows a variable focal length cylindrical lens 161 comprising rectangular micromirrors 162. An array comprising square or rectangle micromirrors 162 is appropriate to a symmetric lens about one in-plane axis such as cylindrical lens 161. The micromirrors with same rotation are controlled by the same electrode or controlled by known semiconductor microelectronics technologies such as MOS or CMOS independently.

FIG. 7 shows a variable focal length circular lens 171 comprising triangular micromirrors 172. An array comprising triangular micromirrors 172 is appropriate to a lens with arbitrary shape and/or size lens like an array comprising hexagonal micromirrors.

The micromirror array lens is an adaptive optical component because the phase of light can be changed by controlling the translations 144 and rotations 142, 143 of micromirrors independently. Adaptive optical micromirror array lens requires two-dimensional arrays of individually addressable micromirrors. To achieve this, it is necessary to combine the micromirrors with on-chip electronics. In order to do this, wafer-level integration of micromirrors with the known microelectronics circuits is necessary.

The micromirror array lens can correct the phase errors since an adaptive optical component can correct the phase errors of light due to the medium between the object and its image, and/or correct the defects of a lens system that cause its image to deviate from the rules of paraxial imagery. For example, the micromirror array lens can correct the phase error due to optical tilt by adjusting the translations 144 and rotations 142, 143 of micromirrors.

The same phase condition satisfied by the micromirror array lens contains an assumption of monochromatic light. Therefore, to get a color image, the micromirror array lens is controlled to satisfy the same phase condition for each wavelength of Red, Green, and Blue (RGB), respectively, and the imaging system can use bandpass filters to make monochromatic lights with wavelengths of Red, Green, and Blue (RGB).

If a color photoelectric sensor is used as an imaging sensor in the imaging system using a micromirror array lens, a color image can be obtained by processing electrical signals from Red, Green, and Blue (RGB) imaging sensors with or without bandpass filters, which should be synchronized with the control of micromirror array lens. To image Red light scattered from an object, the micromirror array lens is controlled to satisfy the phase condition for Red light. During the operation, Red, Green, and Blue imaging sensors measure the intensity of each Red, Green, and Blue light scattered from an object. Among them, only the intensity of Red light is stored as image data because only Red light is imaged properly. To image each Green or Blue light, the micromirror array lens and each imaging sensor works in the same manner as the process for the Red light. Therefore, the micromirror array lens is synchronized with Red, Green, and Blue imaging sensors. Alternatively, the same phase condition for a color image is satisfied by using the least common multiple of wavelengths of Red, Green, and Blue lights as an effective wavelength for the phase condition. In this case, the micromirror array lens is not necessary to be controlled to satisfy the phase condition for each Red, Green, and Blue light individually. Instead, the phase condition for the least common multiple of the wavelengths should be satisfied.

For the simpler control, the translation of each micromirror is only controlled to satisfy the phase condition for one light among Red, Green, and Blue lights or is not controlled to satisfy the phase condition for any other lights of Red, Green, and Blue. Even though the micromirror array lens cannot satisfy the phase condition due to phase error of lights with multi-wavelength, still the lens can be used as a variable focal length lens with low quality.

A second embodiment, variable focal length lens comprising micromirrors with one degree of freedom rotation, is shown in FIGS. 8 through 11.

Figure 8:
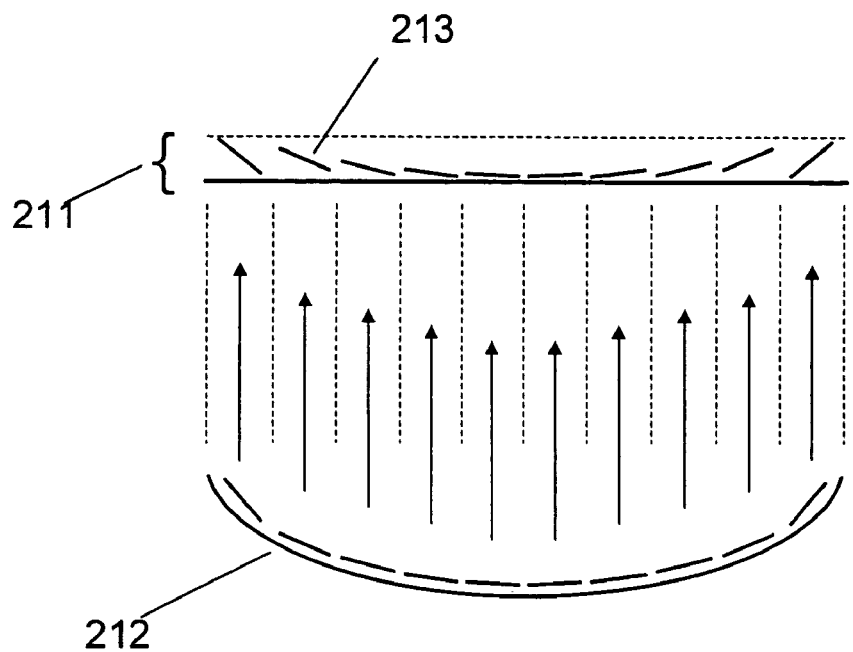
FIG. 8 is a schematic diagram of a second embodiment showing the cut-away side view of a conventional micromirror array lens.

FIG. 8 illustrates the principle of the conventional micromirror array lens 211, which corresponds to FIG. 1 of the first embodiment in its description.

Figure 9:
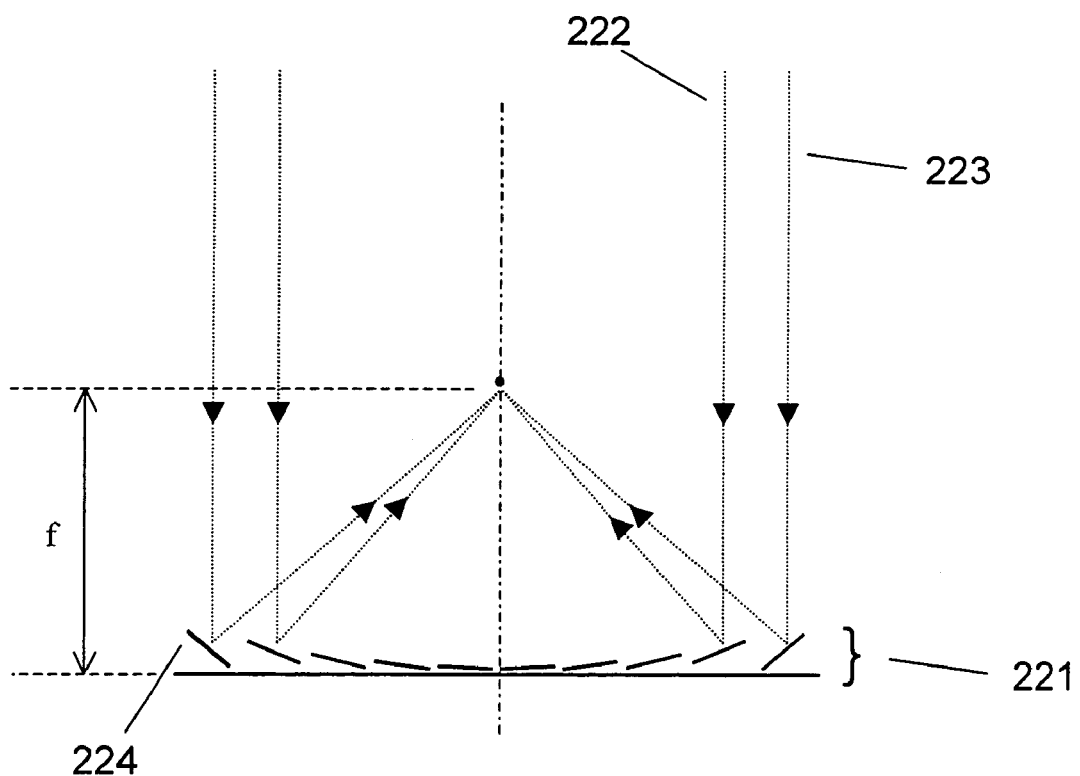
FIG. 9 is a schematic diagram showing how the micromirror array lens comprising micromirrors with only one DOF rotation works as a lens.

FIG. 9 illustrates how the micromirror array lens 221 comprising micromirrors with one DOF rotation images. Arbitrary scattered lights 222, 223 are converged into one point P of the image plane by controlling the positions of the micromirrors 224. The phases of arbitrary lights 222, 223 are not adjusted to satisfy same phase condition. Even though the phase condition is not satisfied, low quality imaging or focusing is still possible.

Figure 10:
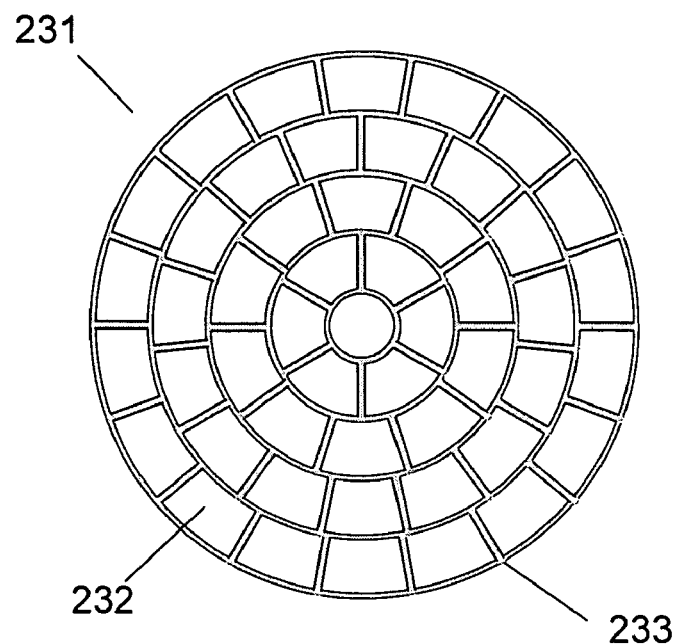
FIG. 10 is an in-plane schematic view showing a circular micromirror array lens comprising micromirrors with one DOF rotation and actuating components.

FIG. 10 illustrates the in-plane view of a circular micromirror array lens 231 comprising micromirrors with one DOF rotation. All micromirrors are arranged in a flat plane because they are fabricated by known microfabrication processes.

It is desired that each of the micromirrors 232 has a curvature because the ideal shape of a conventional reflective lens 212 has a curvature. According to focal length change of the lens, the curvature of micromirror should be controlled. The curvature of the micromirror is controlled by electrothermal or electrostatic force. If the size of the flat micromirror is small enough, the aberration of the micromirror array lens 231 comprising flat micromirrors 232 is also small enough. In this case, the micromirror does not need a curvature.

Figure 11:
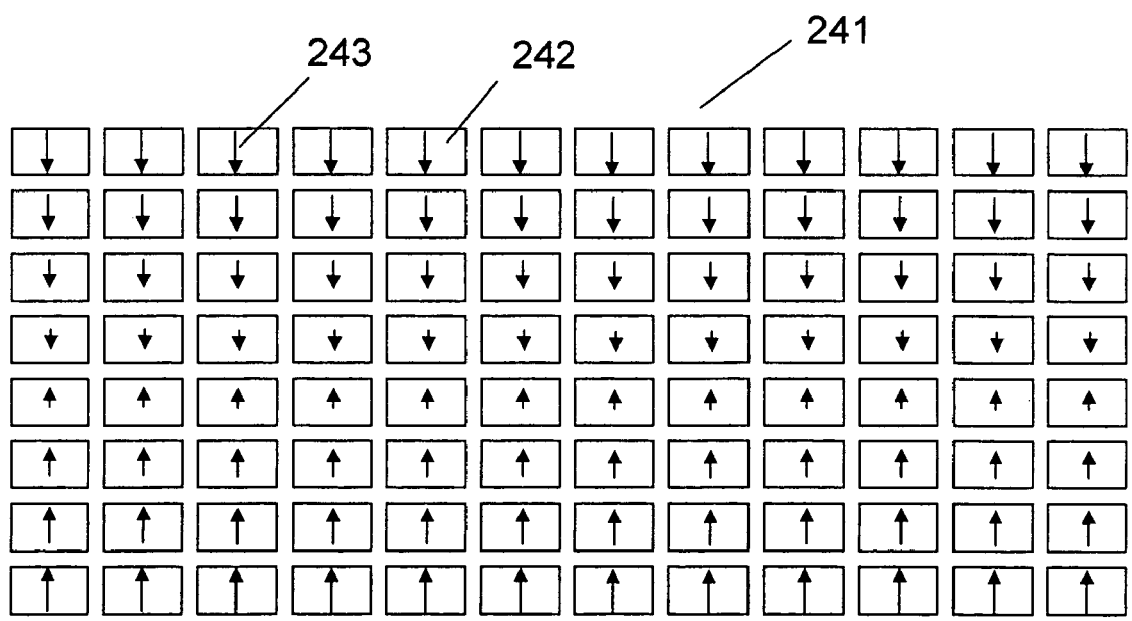
FIG. 11 is a schematic diagram showing the cylindrical lens comprising rectangular shape micromirrors.

FIG. 11 shows a variable focal length cylindrical lens 241 comprising rectangular micromirrors 242.

A third embodiment, variable focal length lens comprising micromirrors with two degrees of freedom rotation, is shown in FIGS. 12 through 18.

Figure 12:
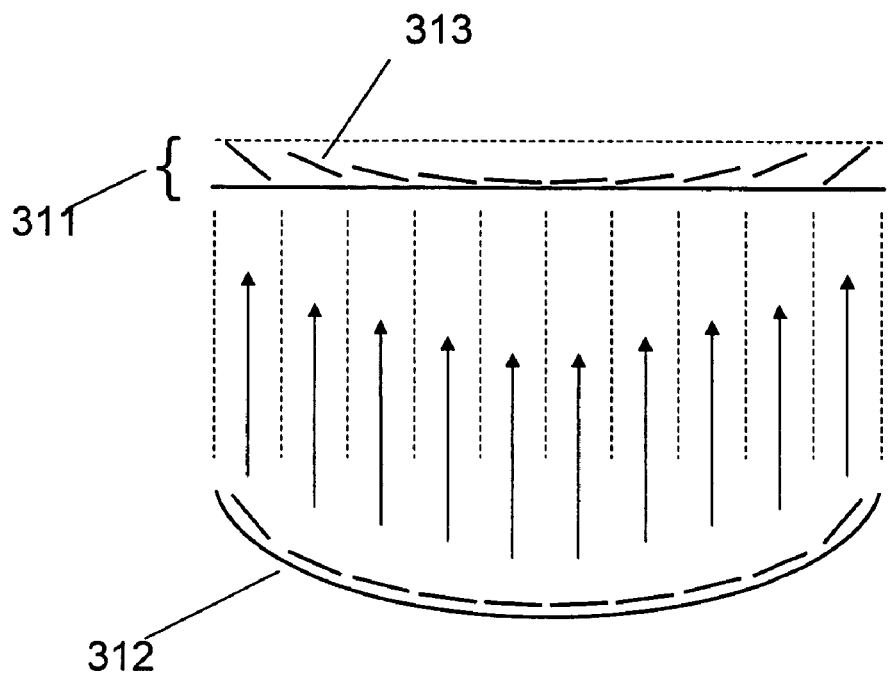
FIG. 12 is a schematic diagram of a third embodiment showing the cut-away side view of a conventional micromirror array lens.

FIG. 12 illustrates the principle of a conventional micromirror array lens 311, which corresponds to FIG. 1 of the first embodiment in its description.

Figure 13:
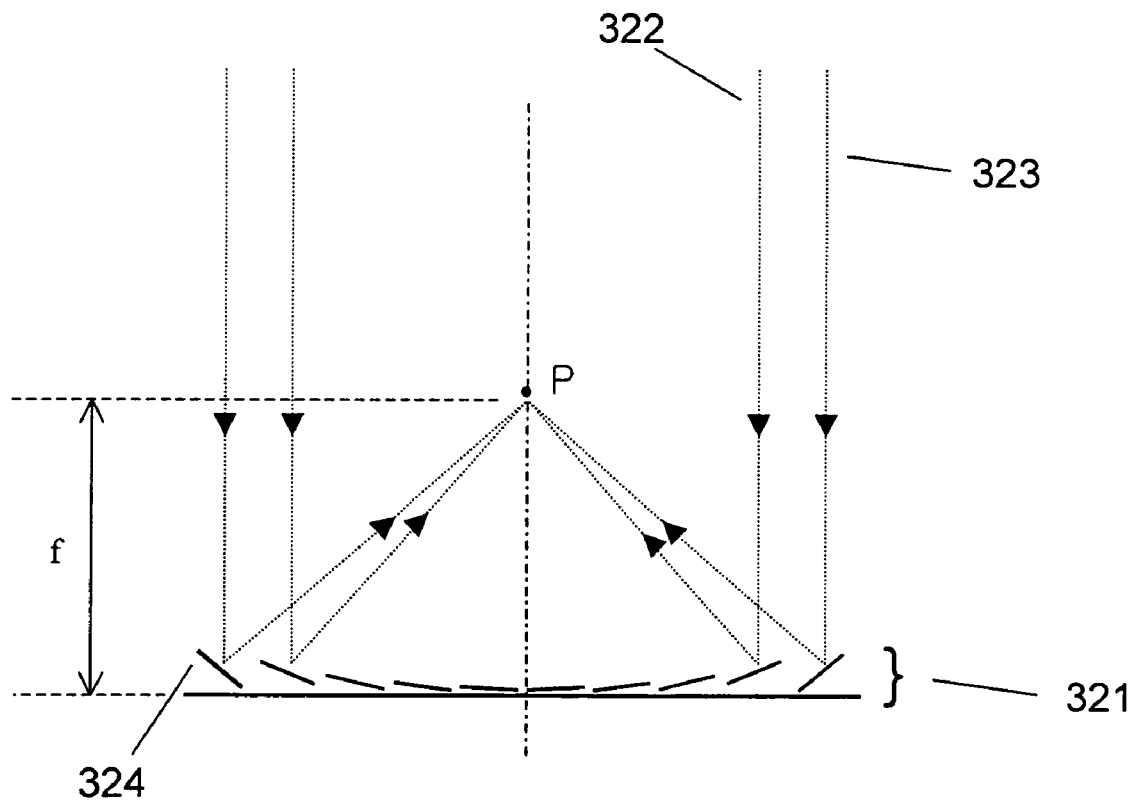
FIG. 13 is a schematic diagram showing how a micromirror array lens comprising micromirrors with two DOF rotation works as a lens.

FIG. 13 illustrates how the micromirror array lens 321 comprising micromirrors with two DOF rotation images. Arbitrary scattered lights 322, 323 are converged into one point P of the image plane by controlling the positions of the micromirrors 324. The phases of arbitrary light 322, 323 are not adjusted to satisfy the same phase condition. Even though the phase condition is not satisfied, low quality imaging or focusing is still possible.

It is desired that each of the micromirrors 324 has a curvature because the ideal shape of a conventional reflective lens 312 has a curvature. According to focal length change of the lens, the curvature of micromirror should be controlled. The curvature of the micromirror is controlled by known electrothermal or electrostatic force. If the size of the flat micromirror is small enough, the aberration of the lens comprising flat micromirrors 324 is also small enough. In this case, the micromirror does not need a curvature. The focal length f of the micromirror array lens 321 is changed by controlling the two DOF rotation of each micromirror 324.

Figure 14:
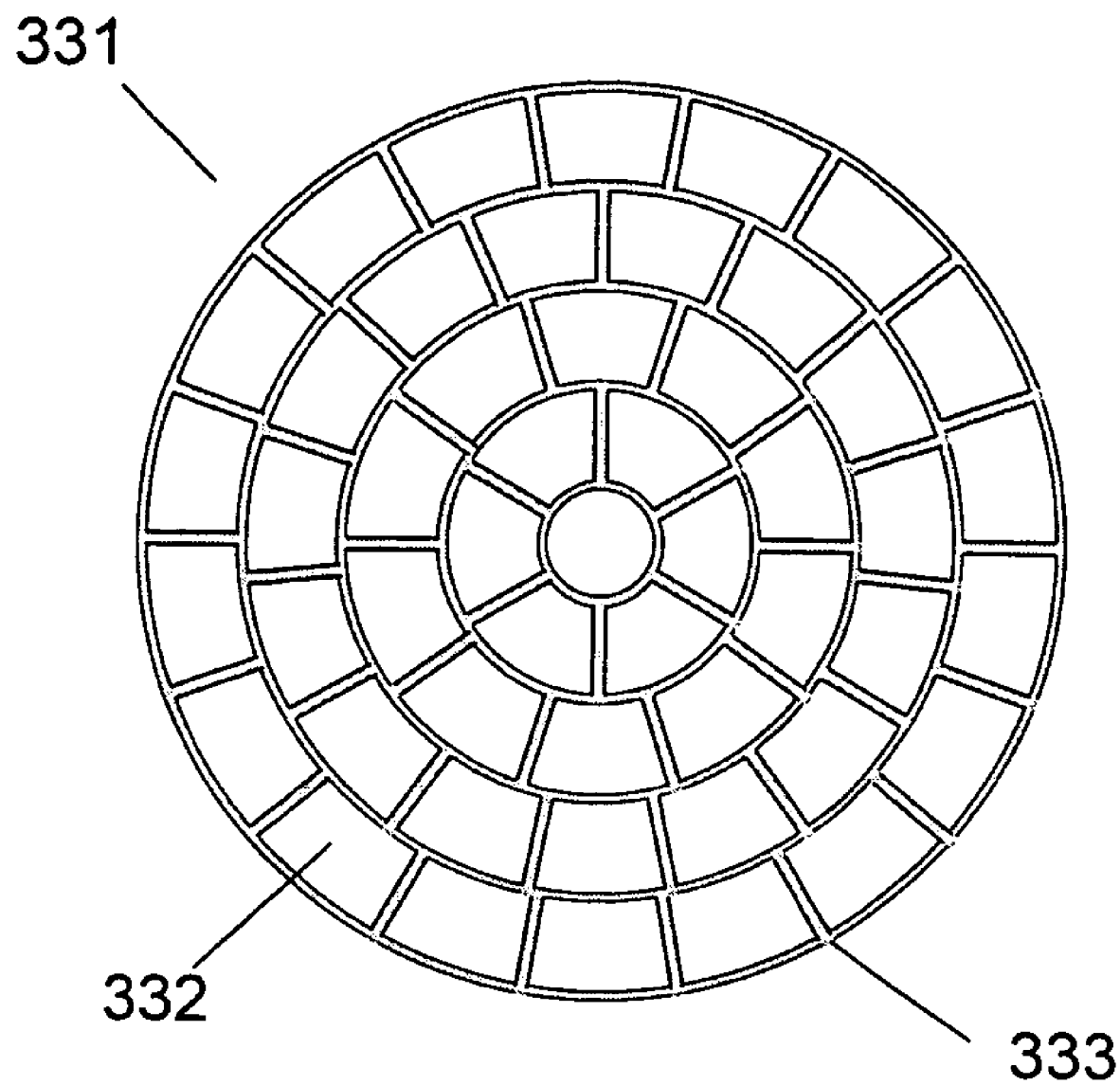
FIG. 14 is an in-plane schematic view showing one of the structures of the micromirror array lens that is made of many micromirrors and actuating components.

FIG. 14 illustrates the in-plane view of a circular micromirror array lens 331, which corresponds to FIG. 2 of the first embodiment. All micromirrors are arranged in a flat plane because they are fabricated by known microfabrication processes.

Figure 15:
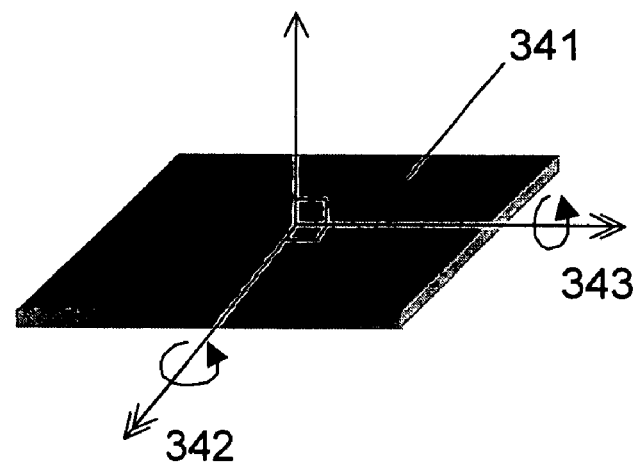
FIG. 15 is a schematic diagram showing two rotational axes of the micromirror.

FIG. 15 shows two DOF rotation of the micromirror 341. The array comprising micromirrors 341 with two DOF rotation 342, 343 which are controlled independently can make a lens with arbitrary shape and/or size, as desired. Incident lights can be modulated arbitrarily by forming an arbitrary shape and/or size lens. To do this, it is required that incident lights are deflected to desired arbitrary directions by controls of two degree of freedom rotations 342, 343.

Figure 16A:
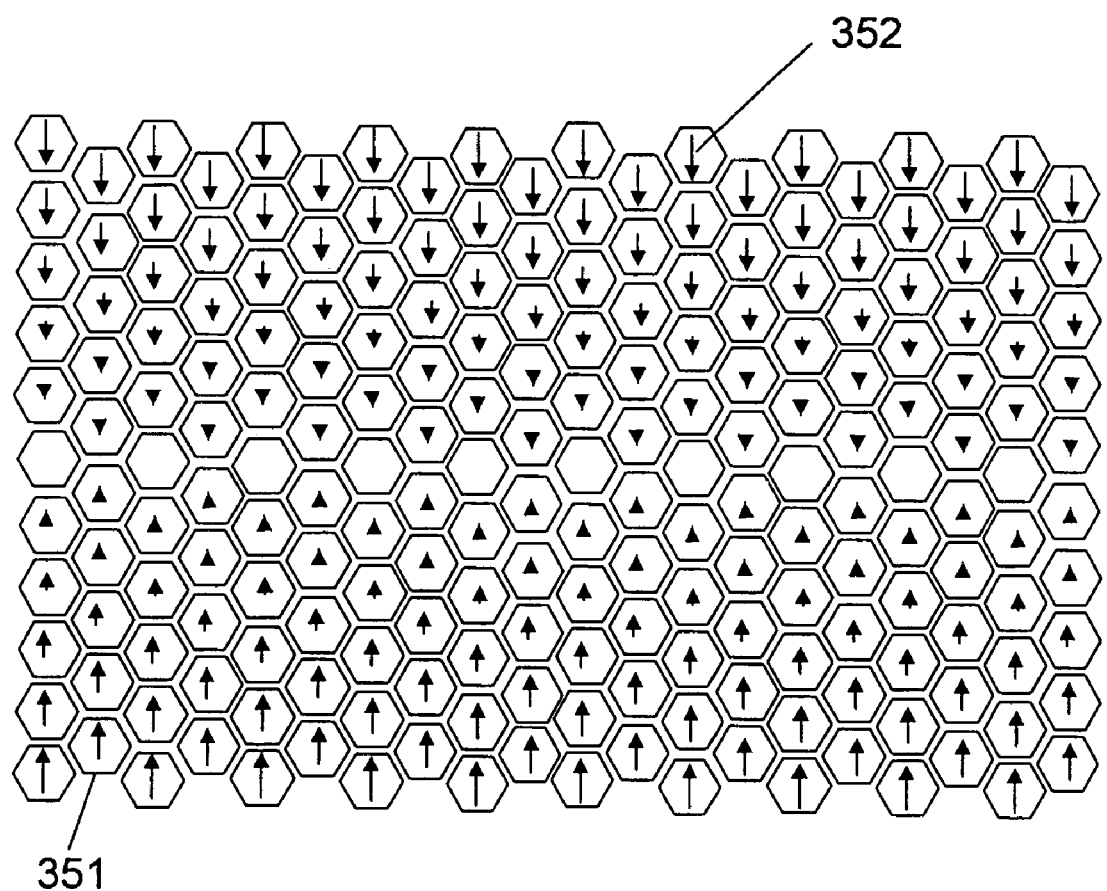
FIGS. 16a-16b are schematic diagrams showing the lenses comprising hexagonal micromirrors.
Figure 16B:
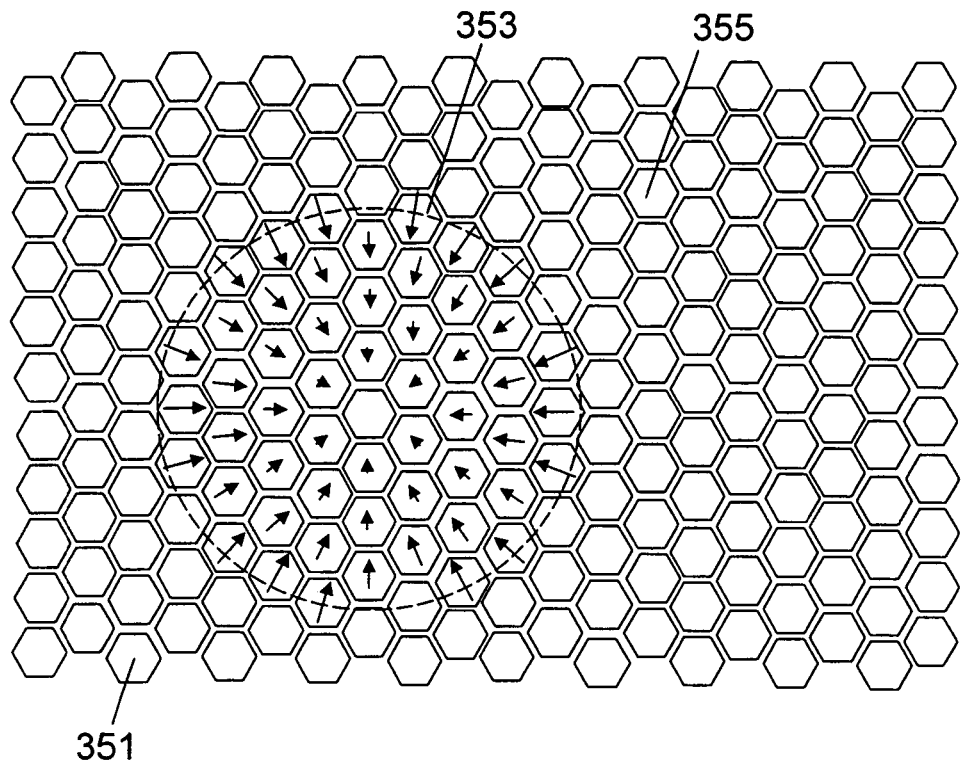
Figure 17:
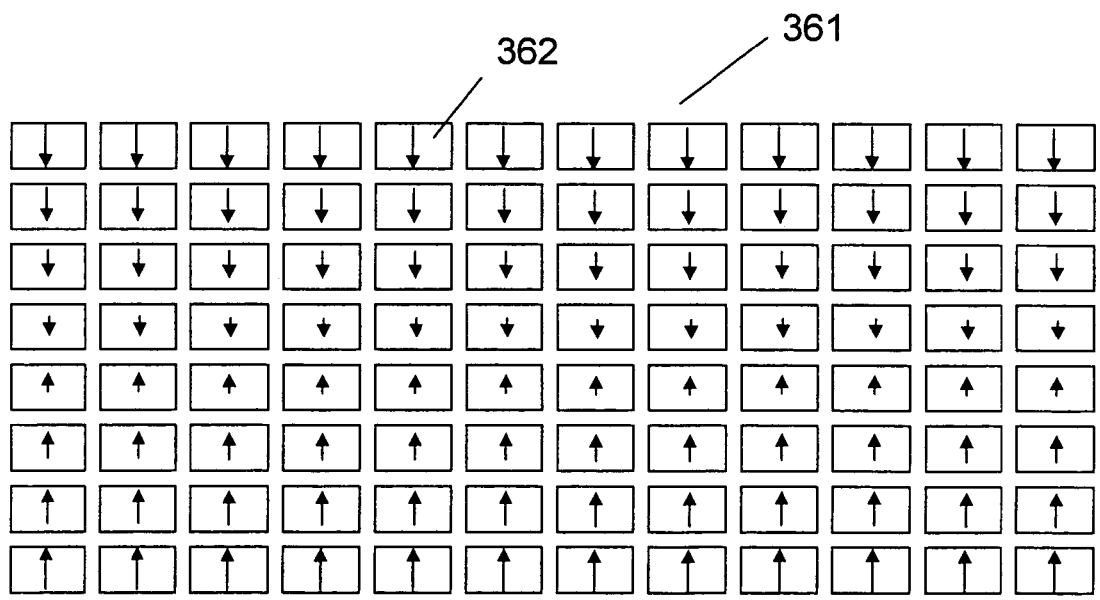
FIG. 17 is a schematic diagram showing the cylindrical lens comprising rectangular micromirrors.
Figure 18:
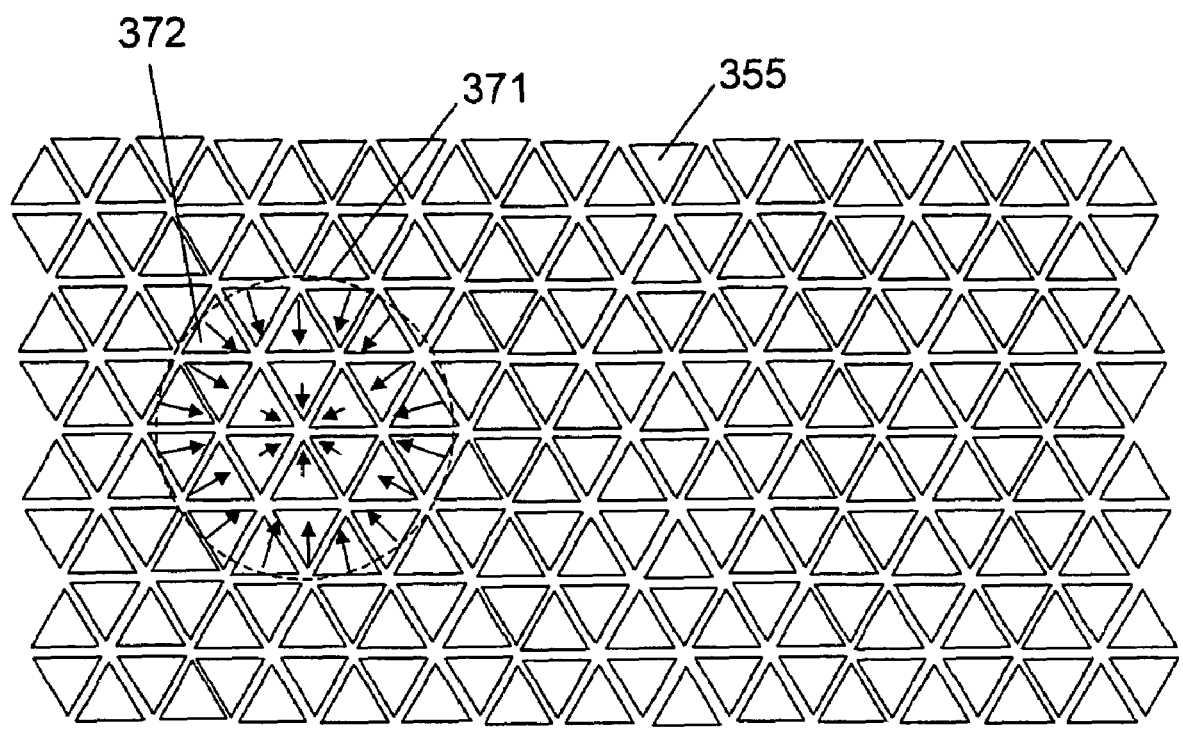
FIG. 18 is a schematic diagram showing the circular lens comprising triangular micromirrors.

In FIGS. 16a, 16b, 17 and 18, the rotation amount of the micromirror is represented by length of arrow 352 and the rotational direction of the micromirror is represented by direction of arrow 352. FIG. 16a shows a variable focal length cylindrical lens comprising hexagonal micromirrors 351. FIG. 16b shows a variable focal length circular lens 353 comprising hexagonal micromirrors 351. Shape, position and size of the variable focal length circular lens 353 can be changed by independent control of micromirrors 351 with two rotations. In FIGS. 16b and 18, micromirrors 355 which are not elements of the lens are controlled to make lights reflected by the micromirrors 355 have no influence on imaging or focusing.

FIG. 17 shows a variable focal length cylindrical lens 361 comprising rectangular micromirrors 362. An array comprising square or rectangle micromirrors 362 is appropriate to a symmetric lens about one in-plane axis such as cylindrical lens 361. Micromirrors with same rotation can be controlled by same electrode or individual electrodes independently.

FIG. 18 shows a variable focal length circular lens 371 comprising triangular micromirrors 372.

A fourth embodiment, variable focal length lens comprising micromirrors with one degree of freedom rotation and one degree of freedom translation, is shown in FIGS. 19 through 22.

Figure 19:
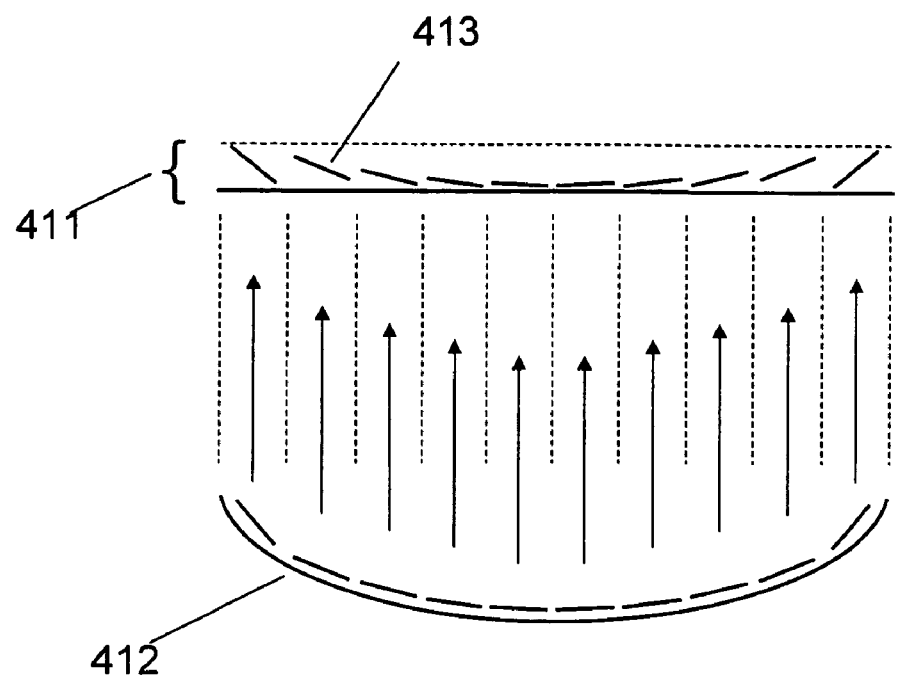
FIG. 19 is a schematic diagram of a fourth embodiment showing the cut-away side view of a micromirror array lens.

FIG. 19 illustrates the principle of the micromirror array lens 411, which corresponds to FIG. 1 of the first embodiment in its description.

Figure 20:
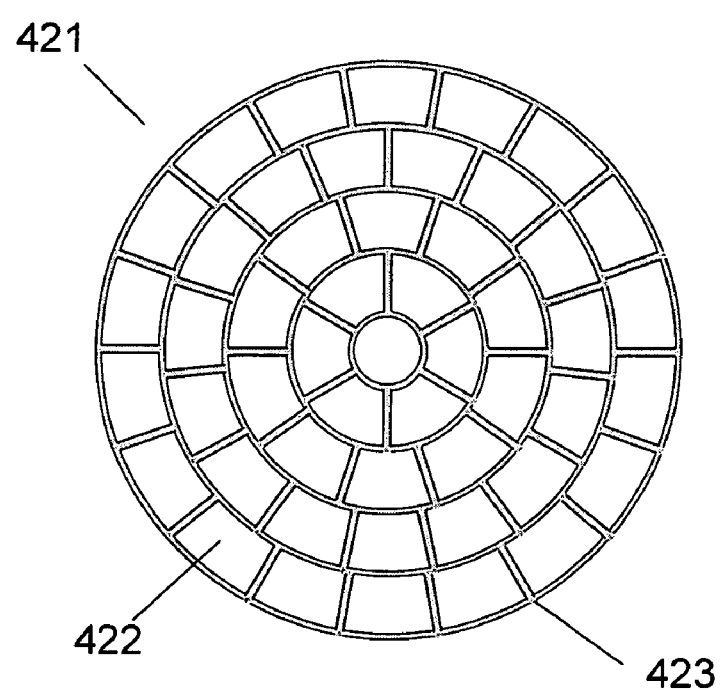
FIG. 20 is an in-plane schematic view showing one of the structures of the micromirror array lens that is made of many micromirrors and actuating components.

FIG. 20 illustrates the in-plane view of the micromirror array lens 421, which corresponds to FIG. 2 of the first embodiment in its description.

Figure 21:
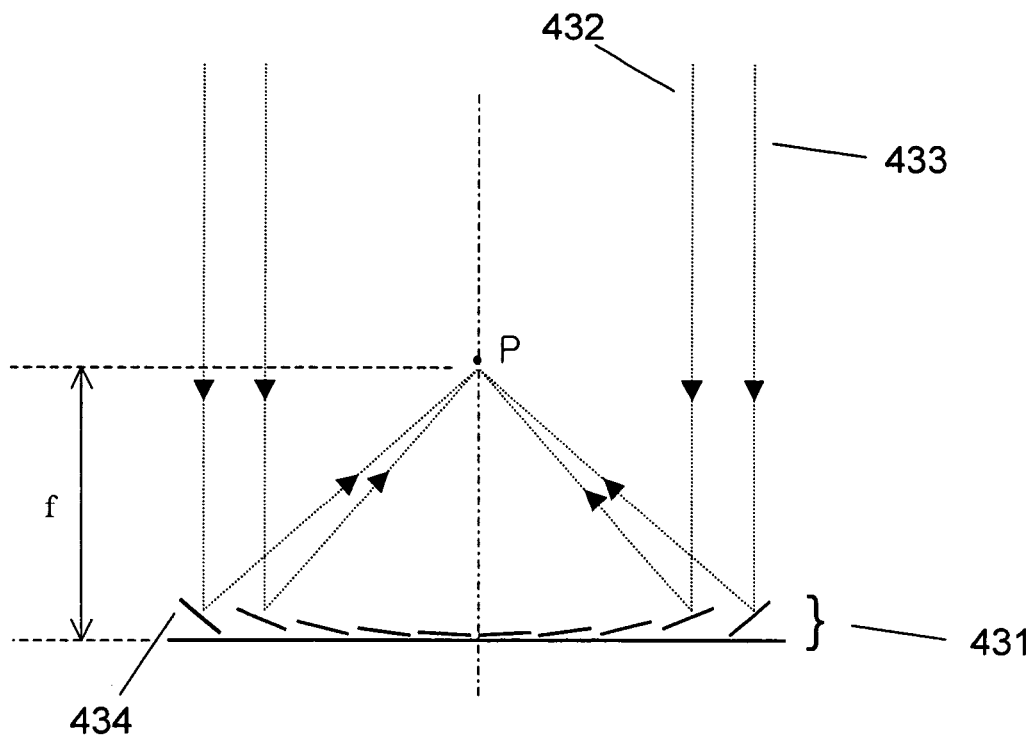
FIG. 21 is a schematic diagram showing how a micromirror array lens works as a lens.

FIG. 21 illustrates how the micromirror array lens 431 images, which corresponds to FIG. 3 of the first embodiment in its description.

Figure 22:
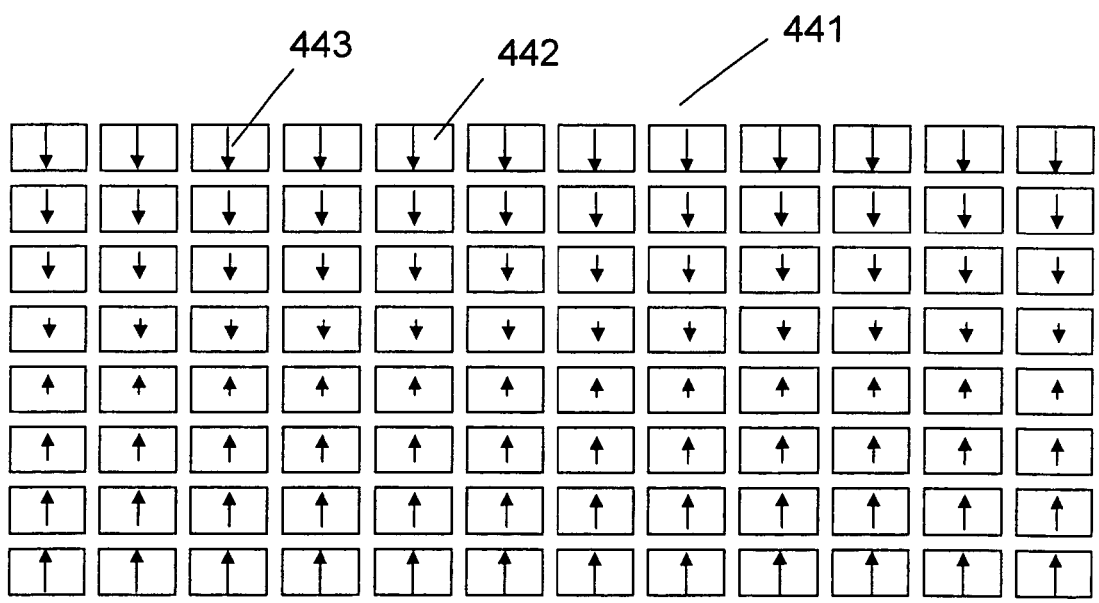
FIG. 22 is a schematic diagram showing the cylindrical lens comprising rectangular micromirrors.

FIG. 22 shows a variable focal length cylindrical lens 441 comprising rectangular micromirrors 442, which corresponds to FIG. 6 of the first embodiment.

The micromirror array lens in this embodiment is an adaptive optical component because the phase of light can be changed by controlling the translations and rotation of micromirrors independently similarly to the first embodiment.

The same phase conditions for monochromatic light and light of Red, Green, and Blue lights as in the first embodiment are applied.

A fifth embodiment, variable focal length lens comprising micromirrors with one degree of freedom translation, is shown in FIGS. 23 through 28.

Figure 23:
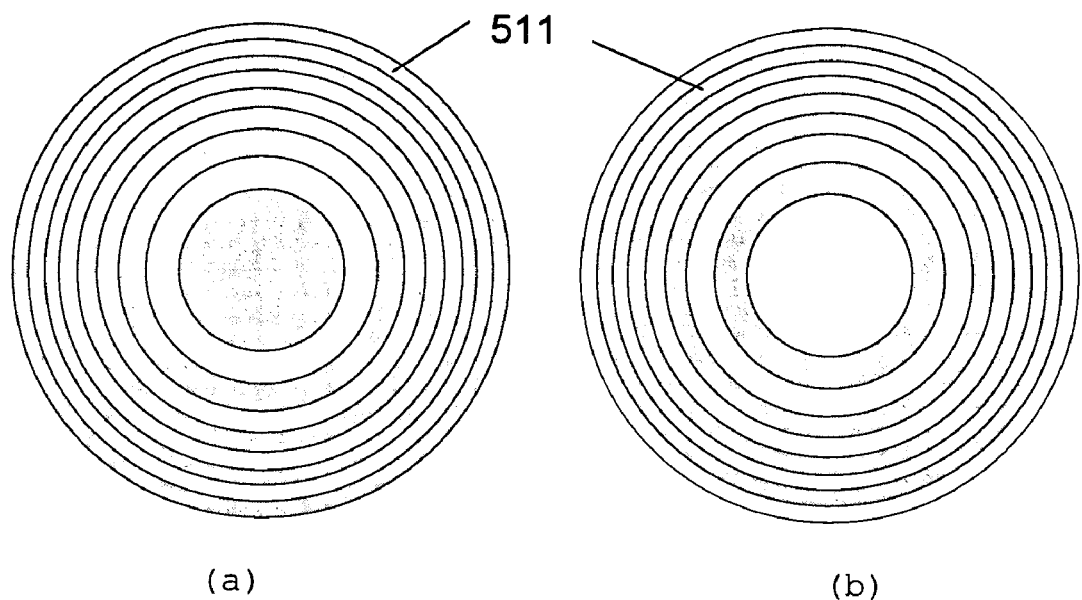
FIG. 23 is a schematic diagram of a fifth embodiment showing the zone plat, which can make a focus by Fresnel diffraction theory.

FIG. 23 shows zone plates. Gray regions (zones) 511 are the area where lights are blocked. In FIG. 23(a), the left plate, light blocked at even zones and in FIG. 23(b), the right plate, lights are blocked at odd zones. But two plates have same focus and intensity. Every zone has the same area and optical path length (OPL) difference between from every adjacent zone to focal point is half wavelength. Focal length is changed by changing the width of zone.

Figure 24:
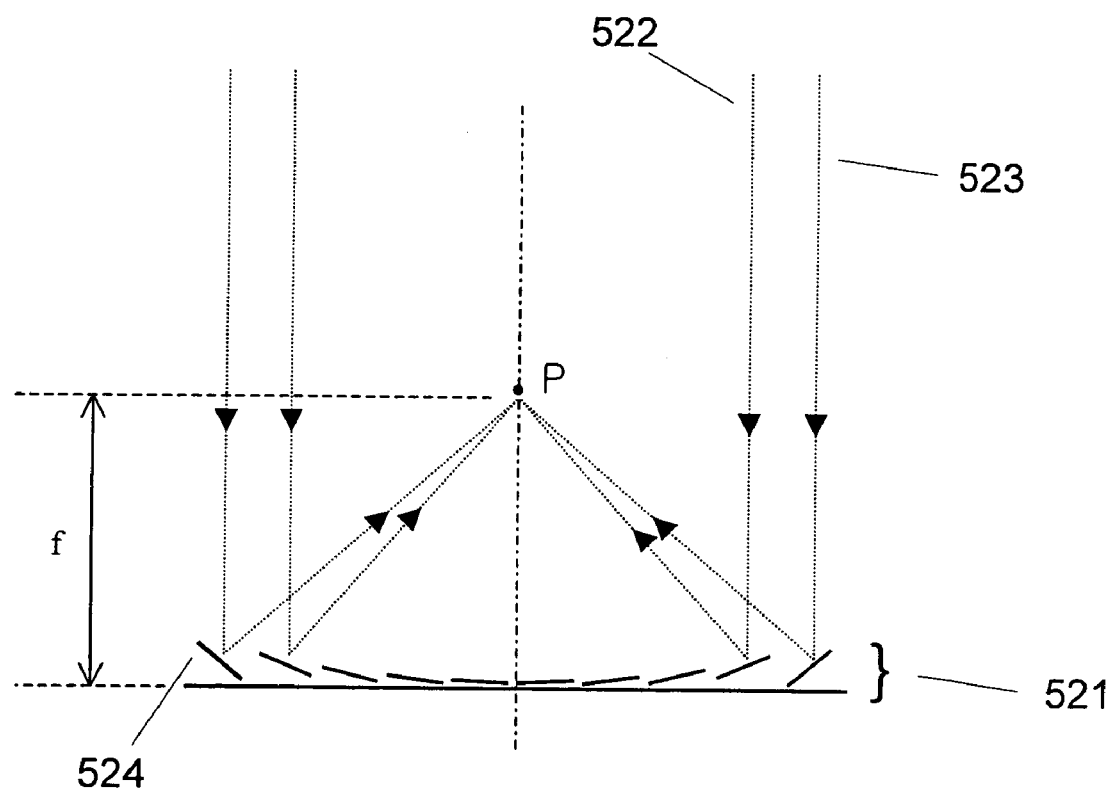
FIG. 24 is a schematic diagram showing how a conventional micromirror array lens works as a lens.
Figure 25:
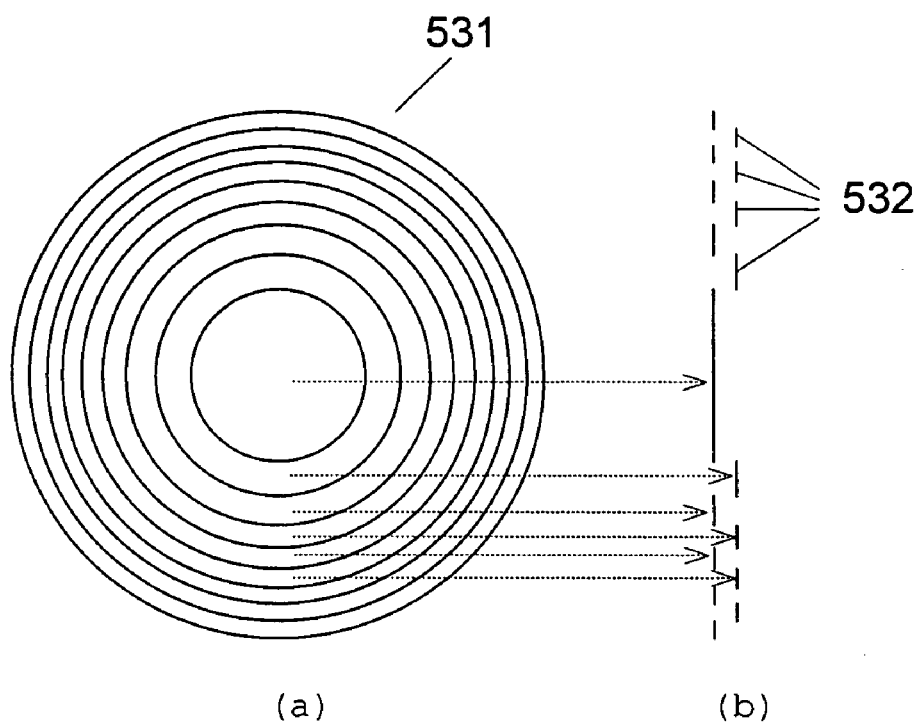
FIG. 25 is a schematic diagram showing in-plane and cross-section of a micromirror array lens using Fresnel diffraction.

FIG. 24 illustrates the principle of the conventional micromirror array lens as in FIG. 1 of the first embodiment. FIG. 24 also illustrates how the conventional micromirror array lens 521 images as in FIG. 3 of the first embodiment.

FIG. 25(a) shows a lens comprising odd and even zone plate 531. To compensate half wavelength phase difference between two zone plates, the odd zone 532 is translated. The whole surface consists of micromirrors which can be translated along the normal axis to the plane. Because the micromirror reflects light, required translation distance of the micromirror is quarter wavelength to make half wavelength phase difference.

Figure 26:
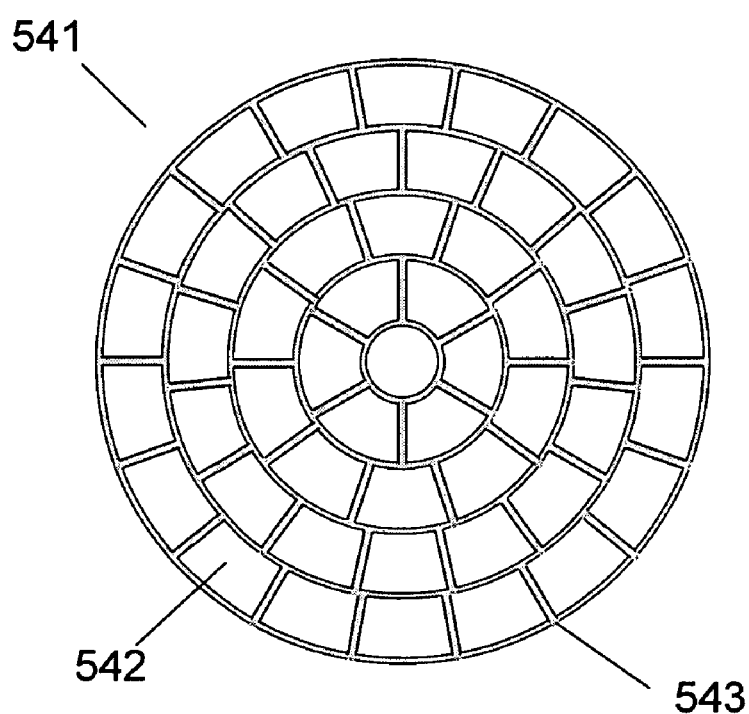
FIG. 26 is an in-plane schematic view showing one of the structures of the micromirror array lens.

FIG. 26 shows an example of the in-plane view of the micromirror array lens 541 as in FIG. 2 of the first embodiment.

Figure 27:
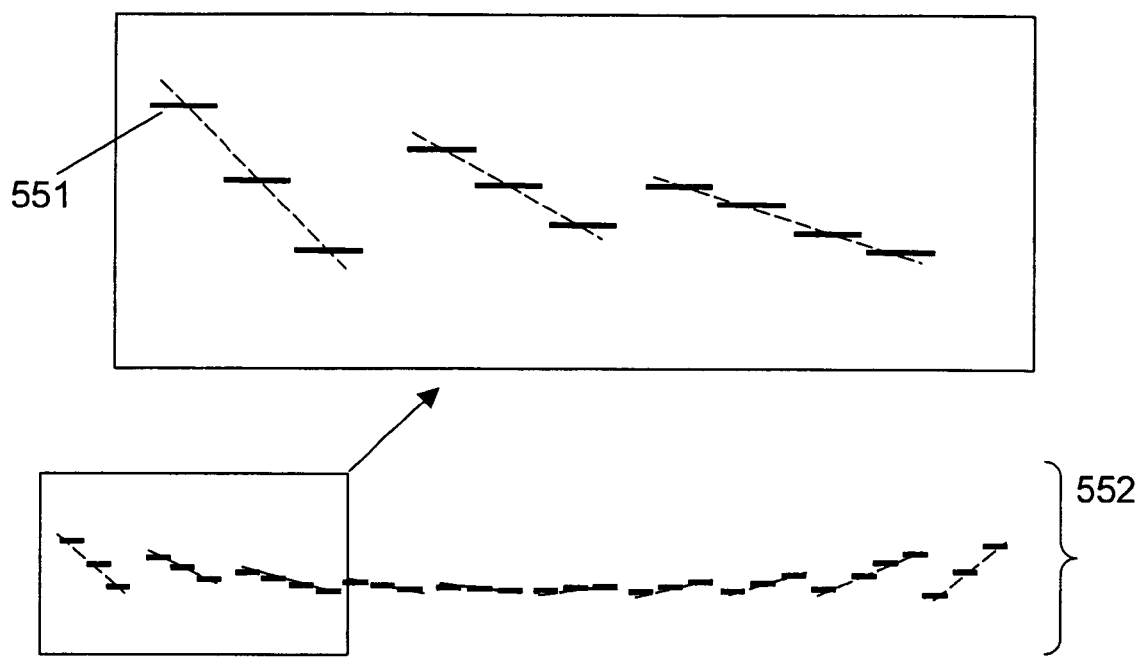
FIG. 27 is a schematic diagram showing the cut-away side view of the micromirror array lens comprising micromirrors with pure translation.

By fine control of the translational motion of each micromirror 551, more improved image can be obtained. FIG. 27 shows this graphically. Along the radial axis of lens, each zone contains several micromirrors 552. Since the phase variation in a zone is pi radian, the aberration of the lens is very large. If the size of each micromirror is controlled more precisely, the aberration of the lens can be decreased.

The independently controlled micromirror can form a lens with arbitrary shape and/or size as desired. Incident lights can be modulated arbitrarily by forming an arbitrary shape and/or size lens. To do this, it is required that incident lights are deflected to desired arbitrary directions by controlling translation of each micromirror independently.

Figure 28:
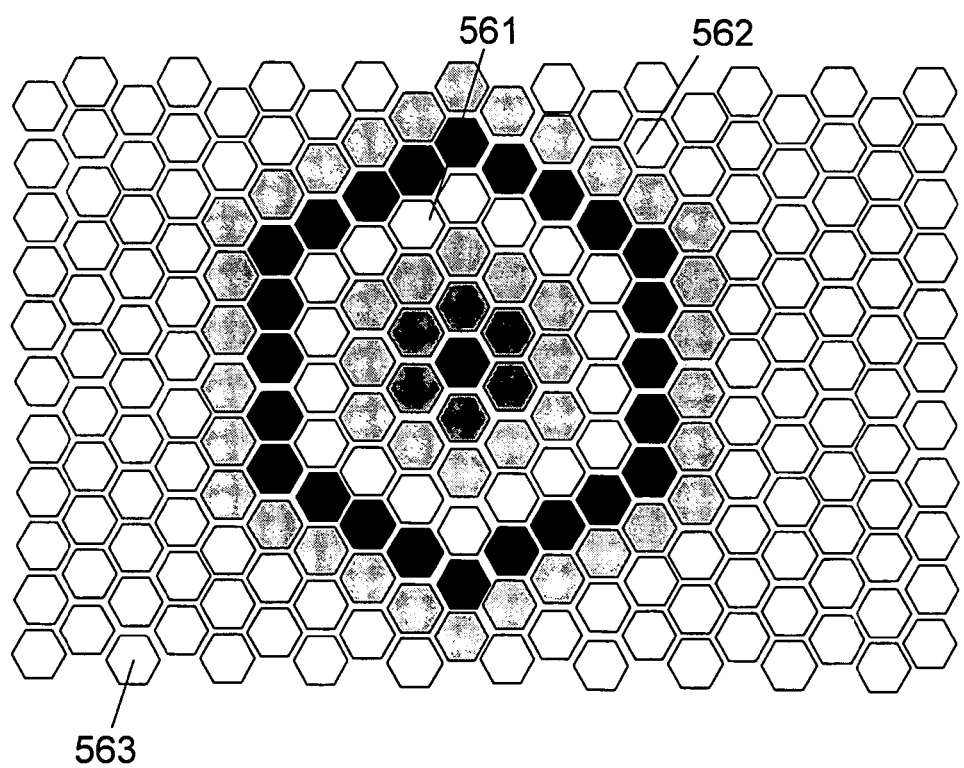
FIG. 28 is a schematic diagram showing one example of the micromirror array lens comprising hexagonal micromirrors with pure translation.

FIG. 28 shows an example of the micromirror array lens 562 comprising hexagonal micromirrors 561. Bright gray of each micromirror 561 represents large translation and dark gray of each micromirror 561 represents small translation.

Micromirrors 563 which are not elements of the lens are controlled to make lights reflected by the micromirrors 563 not have influence or have less influence on imaging or focusing.

Fan shape, rectangle, square, and triangle micromirror array can be used for the micromirror lens. An array comprising fan shape micromirrors is appropriate to an axisymmetric lens. An array comprising square or rectangle micromirrors is appropriate to a symmetric lens about one axis of in-plane such as cylindrical lens. An array comprising triangular micromirrors is appropriate to a lens with desired arbitrary shape and/or size lens like an array comprising hexagonal micromirrors.

The micromirror array lens in this embodiment is also an adaptive optical component because the phase of light can be changed by controlling the translations and rotation of micromirrors independently similarly to the first embodiment.

The same phase conditions for monochromatic light and light of Red, Green, and Blue lights as in the first embodiment are applied.

In the five embodiments of the above, the lens can be improved much by introducing some modifications.

Figure 29:
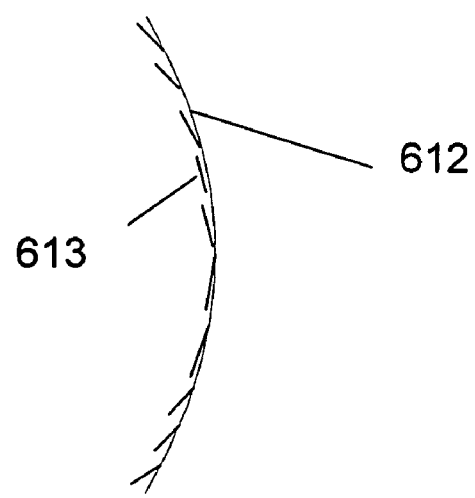
FIG. 29 is a schematic diagram showing the cut-away side view of a micromirror array lens on a curved plane.

In the variable focal length lens of the five embodiments, all of the micromirrors 113 are arranged in a flat plane 112 as shown in FIG. 1. In order to obtain a large numerical aperture of the micromirror array lens, however, rotation of the micromirrors by a large angle is needed, which is very difficult. This difficulty can be overcome if the micromirrors 613 are arranged in a curved plane 612 with a predetermined curvature or a paraboloidal plane with a predetermined focus as shown in FIG. 29.

In other improvement, the material of electrode wire can be material with high electrical conductivity, preferably metal. Then, the electrical resistance can be lowered, and supplying voltage to the electrode for the micromirrors is facilitated much.

In another improvement, the reflectivity of the micromirrors can be increased by using aluminum coated with multi-layer dielectric material, aluminum coated with antioxidant, silver coated with multi-layer dielectric material, silver coated with antioxidant, gold, or gold coated with multi-layer dielectric material. Aluminum has a high reflectivity for the spectrum range of visible light, and is easy and cheap in manufacturing. Silver has a very high reflectivity for the spectrum range of visible light. Gold has a very high reflectivity for the spectrum range of infrared light. Multi-layer dielectric coating to aluminum, silver, and gold increases the reflectivity further. And, antioxidant coating can be used to keep aluminum or silver from oxidizing with time.

In still another improvement, the variable focal length lens is an adaptive optical component. Since the lens is of a reflective type, arranging the lens obliquely with respect to the image is needed, which becomes a reason for aberrations. By controlling the micromirrors individually, the lens corrects the aberrations when the object does not lie on the optical axis.

In SPIE paper and the embodiments of the above, the lens was axisymmetric and the electrodes were arranged along the concentric circles. In some application as in the oblique arrangement of the lens with respect to the optical axis of the system, it is preferable that the micromirrors are controlled independently for the micromirrors with two degrees of freedom rotation or that the micromirrors are arranged along ellipses and controlled by electrodes arranged along ellipses.

Figure 30:
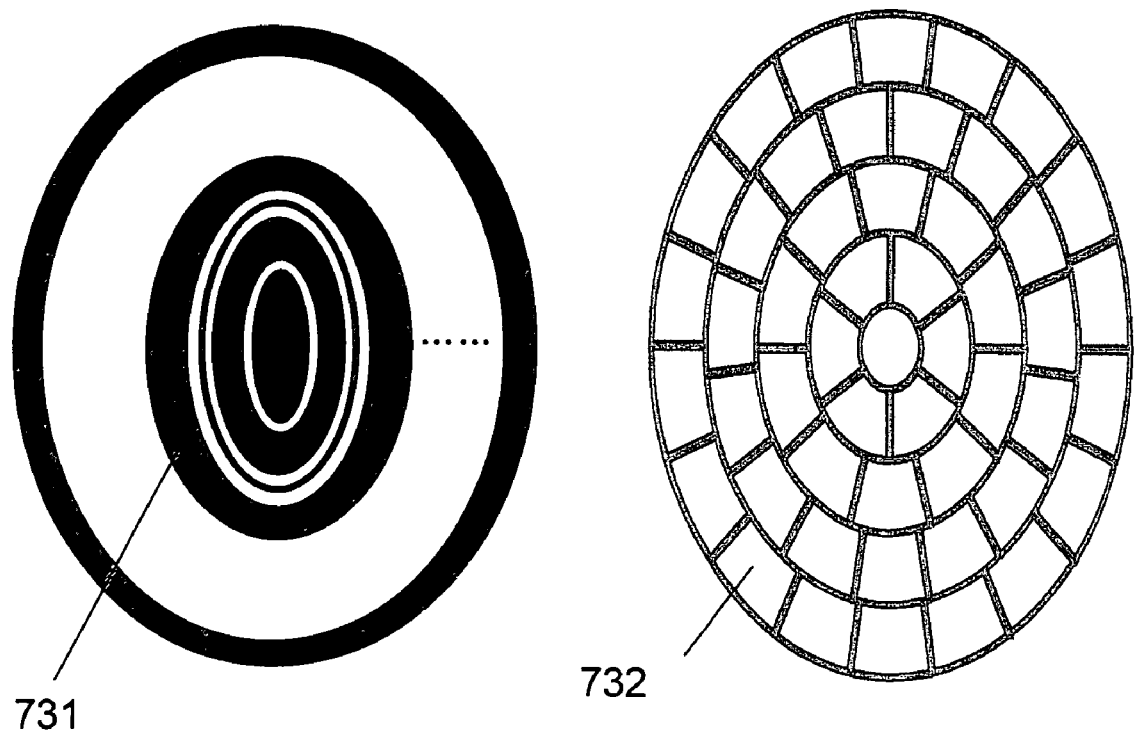
FIG. 30 is an in-plane schematic view showing the micromirror array lens with micromirrors and electrodes arranged on ellipses.

In FIG. 30, the micromirrors 732 are arranged to form one or more ellipses 731 to form the lens. The micromirrors on same ellipse are controlled by the same electrodes as in the axisymmetrical lens.

Figure 31:
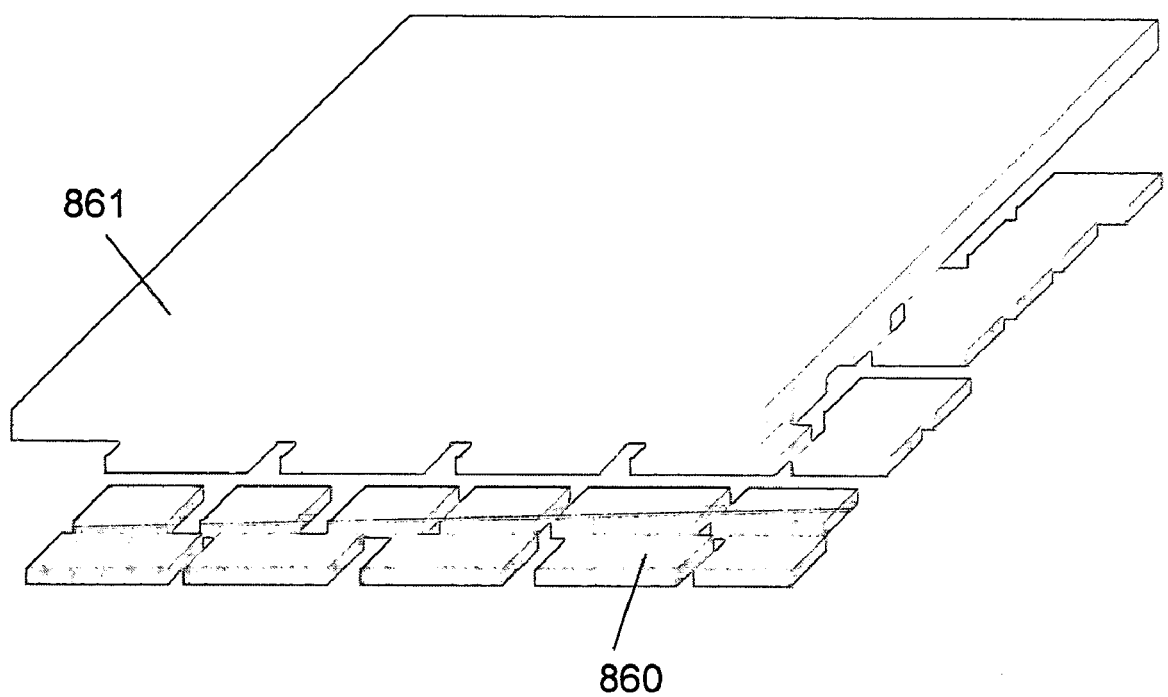
FIG. 31 is a schematic diagram showing a micromirror comprising segmented electrodes.

FIG. 31 shows a type of the Discretely Controlled Micromirror (DCM) using segmented electrodes 860. In contrast with conventional electrostatic micromirrors, this embodiment comprises segmented electrodes 860 with different areas, positions, and discrete voltages. This embodiment has the same disadvantages as the conventional electrostatic micromirror except for compatibility with known microelectronics technologies for the control circuit. The micromirror 861 can have the desired three degrees of freedom by the appropriate combinations of segmented electrodes 860 with different areas, positions, and discrete voltages.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A variable focal length lens comprising a plurality of micromirrors, wherein each of the micromirrors is controlled to satisfy a same phase condition and a converging condition and change the focal length of the lens.

2. The variable focal length lens of claim 1, wherein one degree of freedom translation of the micromirrors is controlled.

3. The variable focal length lens of claim 1, wherein one degree of freedom rotation of the micromirrors is controlled.

4. The variable focal length lens of claim 1, wherein one degree of freedom rotation and one degree of freedom translation of the micromirrors are controlled.

5. The variable focal length lens of claim 1, wherein two degree of freedom rotations of the micromirrors are controlled.

6. The variable focal length lens of claim 1, wherein two degree of freedom rotations and one degree of freedom translation of the micromirrors are controlled.

7. The variable focal length lens of claim 1, wherein the micromirrors are controlled independently.

8. The variable focal length lens of claim 1, wherein the micromirror comprises a plurality of segmented electrodes, wherein the segmented electrodes determine the position of the micromirror.

9. The variable focal length lens of claim 1, wherein the micromirror comprises electrode wires which are made of material with high electrical conductivity to supply actuating power.

10. The variable focal length lens of claim 9, wherein the electrode wires are made of metal.

11. The variable focal length lens of claim 1, wherein control circuitry is constructed under the micromirrors by using microelectronics fabrication technologies.

12. The variable focal length lens of claim 1, wherein the reflective surface of the micromirror is substantially flat.

13. The variable focal length lens of claim 1, wherein the reflective surface of the micromirror has a curvature.

14. The variable focal length lens of claim 13, wherein the curvatures of the micromirrors are controlled.

15. The variable focal length lens of claim 14, wherein the curvatures of the micromirrors are controlled by electrothermal force.

16. The variable focal length lens of claim 14, wherein the curvatures of the micromirrors are controlled by electrostatic force.

17. The variable focal length lens of claim 1, wherein the micromirror has a fan shape.

18. The variable focal length lens of claim 1, wherein the micromirror has a hexagonal shape.

19. The variable focal length lens of claim 1, wherein the micromirror has a rectangular shape.

20. The variable focal length lens of claim 1, wherein the micromirror has a square shape.

21. The variable focal length lens of claim 1, wherein the micromirror has a triangle shape.

22. The variable focal length lens of claim 1, wherein all of the micromirrors are arranged in a flat plane.

23. The variable focal length lens of claim 1, wherein all of the micromirrors are arranged in a curved plane with a predetermined curvature.

24. The variable focal length lens of claim 1, wherein the micromirrors are arranged to form one or more concentric circles to form a lens.

25. The variable focal length lens of claim 24, wherein the micromirrors on each of the concentric circles are controlled by one or more electrodes corresponding to the concentric circle.

26. The variable focal length lens of claim 1, wherein micromirrors are arranged to form one or more ellipses to form the lens.

27. The variable focal length lens of claim 26, wherein micromirrors on same ellipse are controlled by the same electrodes.

28. The variable focal length lens of claim 1, wherein the micromirrors are actuated by electrostatic force.

29. The variable focal length lens of claim 1, wherein the micromirrors are actuated by electromagnetic force.

30. The variable focal length lens of claim 1, wherein the micromirrors are actuated by electrostatic force and electromagnetic force.

31. The variable focal length lens of claim 1, wherein the surface material of the micromirror is the one with high reflectivity.

32. The variable focal length lens of claim 31, wherein the surface material of the micromirror is metal.

33. The variable focal length lens of claim 31, wherein the surface material of the micromirrors comprises aluminum coated with multi-layer dielectric material.

34. The variable focal length lens of claim 31, wherein the surface material of the micromirrors comprises aluminum coated with antioxidant.

35. The variable focal length lens of claim 31, wherein the surface material of the micromirrors comprises silver coated with multi-layer dielectric material.

36. The variable focal length lens of claim 35, wherein the surface material of the micromirrors comprises silver coated with antioxidant.

37. The variable focal length lens of claim 1, wherein the surface material of the micromirrors comprises gold.

38. The variable focal length lens of claim 37, wherein the surface material of the micromirrors comprises gold coated with multi-layer dielectric material.

39. The variable focal length lens of claim 1, wherein a mechanical structure upholding the micromirrors and actuating components are located under the micromirrors.

40. The variable focal length lens of claim 1, wherein the lens is an adaptive optical component, wherein the lens compensates for phase errors of light due to the medium between an object and its image.

41. The variable focal length lens of claim 1, wherein the lens is an adaptive optical component, wherein the lens corrects aberrations.

42. The variable focal length lens of claim 1, wherein the lens is an adaptive optical component, wherein the lens corrects the defects of an imaging system that cause the image to deviate from the rules of paraxial imagery.

43. The variable focal length lens of claim 1, wherein the lens is an adaptive optical component, wherein an object which does not lie on the optical axis can be imaged by the lens without macroscopic mechanical movement.

44. The variable focal length lens of claim 1, wherein the lens is an adaptive optical component, wherein the lens corrects aberrations when the object does not lie on the optical axis by controlling the micromirrors individually.

45. The variable focal length lens of claim 1, wherein the lens is controlled to satisfy same phase condition for each wavelength of Red, Green, and Blue (RGB), respectively, to get a color image.

46. The variable focal length lens of claim 1, wherein the lens is controlled to satisfy same phase condition for one wavelength among Red, Green, and Blue (RGB) to get a color image.

47. The variable focal length lens of claim 1, wherein same phase condition for color imaging is satisfied by using the least common multiple of wavelengths of Red, Green, and Blue lights as an effective wavelength for the same phase condition.

48. The variable focal length lens of claim 1, wherein the micromirror is not controlled to satisfy same phase condition for color imaging.

* * * * *